United States Patent
Bruno et al.

(10) Patent No.: US 9,734,723 B1
(45) Date of Patent: Aug. 15, 2017

(54) PROCESS AND SYSTEM TO REGISTER AND REGULATE UNMANNED AERIAL VEHICLE OPERATIONS

(71) Applicant: Exelis Inc., Herndon, VA (US)

(72) Inventors: Ronald Bruno, Arlington, VA (US); James Mathew Keller, Silver Spring, MD (US); Christian Ramsey, Purcellville, VA (US)

(73) Assignee: Exelis Inc., Herndon, VA (US)

( * ) Notice: Subject to any disclaimer, the term of this patent is extended or adjusted under 35 U.S.C. 154(b) by 55 days.

(21) Appl. No.: 14/800,204

(22) Filed: Jul. 15, 2015

(51) Int. Cl.
| | | |
|---|---|---|
| *G08G 5/00* | (2006.01) | |
| *G01C 21/00* | (2006.01) | |
| *B64C 39/02* | (2006.01) | |
| *G05D 1/00* | (2006.01) | |
| *G01C 21/20* | (2006.01) | |
| *G05D 1/02* | (2006.01) | |
| *G05D 1/04* | (2006.01) | |
| *G08G 5/04* | (2006.01) | |
| *G05D 1/10* | (2006.01) | |
| *B64C 19/00* | (2006.01) | |

(52) U.S. Cl.
CPC .............. *G08G 5/003* (2013.01); *B64C 19/00* (2013.01); *B64C 39/02* (2013.01); *B64C 39/024* (2013.01); *G01C 21/00* (2013.01); *G01C 21/005* (2013.01); *G01C 21/20* (2013.01); *G05D 1/00* (2013.01); *G05D 1/02* (2013.01); *G05D 1/042* (2013.01); *G05D 1/10* (2013.01); *G08G 5/00* (2013.01); *G08G 5/0039* (2013.01); *G08G 5/04* (2013.01)

(58) Field of Classification Search
CPC .......... G05D 1/10; G05D 1/0011; G05D 1/00; G05D 1/02; G05D 1/042; G08G 5/00; G08G 5/0039; G08G 5/0034; G08G 5/003; G08G 5/04; B64C 39/02; B64C 39/024; B64D 47/08; B08G 5/0069; G01C 21/00; G01C 21/005; G01C 21/20
See application file for complete search history.

(56) References Cited

U.S. PATENT DOCUMENTS

| | | | |
|---|---|---|---|
| 9,412,278 B1 * | 8/2016 | Gong | H04L 63/101 |
| 9,604,723 B2 * | 3/2017 | Liu | B64C 39/024 |
| 2012/0158280 A1 * | 6/2012 | Ravenscroft | G01C 21/005 |
| | | | 701/400 |

(Continued)

*Primary Examiner* — Behrang Badii
(74) *Attorney, Agent, or Firm* — Edell, Shapiro & Finnan LLC

(57) ABSTRACT

A registration authority (RA) server registers unmanned aerial vehicles (UAVs) and their owners/operators (O/O). A UAV is maintained in a flight lock state until a flight plan request from the O/O is approved by the RA, which sends an key-signed approval to unlock the UAV's flight lock. The RA server evaluates a UAV's proposed flight plan based on the attributes of the O/O and UAV, the location and time of the requested flight plan, and a set of flight rules and exclusion zones that are developed in view of privacy assurance, security assurance, flight safety assurance, and ground safety assurance. The flight plan key-signed approval supplied to the UAV by the RA server specifies an inclusion zone that corresponds to a flight plan trajectory to be followed. Once in flight, the UAV maintains real-time knowledge of its position and time to ensure its flight remains within the approved inclusion zone.

20 Claims, 17 Drawing Sheets

(56) References Cited

U.S. PATENT DOCUMENTS

| | | | |
|---|---|---|---|
| 2016/0068267 A1* | 3/2016 | Liu | B64C 39/024 |
| | | | 701/11 |
| 2016/0140851 A1* | 5/2016 | Levy | G08G 5/0069 |
| | | | 701/3 |
| 2016/0189549 A1* | 6/2016 | Marcus | G08G 5/0034 |
| | | | 701/3 |
| 2016/0225263 A1* | 8/2016 | Salentiny | G08G 5/003 |
| 2016/0260331 A1* | 9/2016 | Salentiny | G08G 5/003 |

* cited by examiner

PROCESS AND SYSTEM TO REGISTER AND REGULATE UNMANNED AERIAL VEHICLE OPERATIONS

BACKGROUND

The number of unmanned aerial vehicles (UAVs) will grow rapidly in the coming years. A comprehensive regulatory framework for controlling and managing the use of UAVs is essential to addressing legitimate safety, security, privacy, and nuisance concerns. Because of the potential encroachment by UAVs into the airspace of conventional aircraft, as well as their potential as a delivery system for weapons, much of the initial regulatory focus has been on preventing UAVs from flying into restricted airspaces.

Approaches for preventing UAVs from flying in restricted airspaces have been an important discussion topic of the emerging UAV industry. One such approach is procedural: educating commercial and personal UAV owner/operators to learn and obey flight restrictions. This approach relies on the discipline of owner/operators and is not likely to succeed in a future environment in which potentially tens of millions of UAVs may be operating in the U.S. airspace, with similar numbers in airspaces of regions around the world.

Another approach involves employing the UAV Operating System (OS). Some UAV manufacturers are beginning to incorporate geographical restrictions in their operating systems. While this development is a positive step toward UAV regulation, the changing and dynamic nature of geographical restrictions creates a challenge for the UAV to maintain an up-to-date and dynamic database. This challenge will be particularly acute in a future environment involving tens of millions of UAVs in the U.S. airspace.

The above approaches do not provide a sufficient regulatory framework for the most basic monitoring and control that a regulator would require for UAV operations in airspaces. Such functions include:

Registering UAV Owner/Operators (O/Os) with a designated authority;

Registering UAVs with a designated authority, where every UAV has a unique Electronic ID (EID);

Capturing the O/O identity of every UAV so that it is bound to the UAV EID. Thus, when a UAV causes damage or some other event, the O/O can be identified and held accountable;

Flight Planning, where a UAV O/O is required to submit a "flight plan" and get approval before the UAV is allowed to fly;

Preventing UAVs from flying in restricted airspaces in a practical way whether the application is for commercial or personal use (prevention must be more than procedural);

Maintaining real-time and historical data on UAV operations, including where and when they operate, what payload(s), and for what application; and Achieving the above objectives at the lowest cost in O/O time and money and with a minimal impact on the design of UAVs.

Without an innovative approach, the default aviation regulatory processes being applied to UAVs are slow and not well equipped to progress at the pace at which the UAV industry is growing. In addition, it is not clear that regulatory authorities for controlling conventional aviation have the skills, authority, or vision to properly and appropriately regulate the lowest classes of UAVs, whose size, weight, and flight parameters are orders of magnitude below that of conventional aircraft. Finally, the issue of who has legal authority over airspace close to ground level is under some question. As one considers the use of UAVs in airspace close to the ground, local jurisdictions and property owners have some practical, if not legal, authority in addition to the civil aviation authority (e.g., the FAA in the United States).

SUMMARY

The described system provides a comprehensive approach to registering and regulating unmanned aerial vehicles (UAVs) commonly referred to as drones. A registration authority (RA) server initially registers and authenticates both owners/operators (O/O) of UAVs and the UAVs themselves. A UAVs is maintained in a default "flight lock" state until a flight plan request from the O/O is evaluated and approved by the RA, which sends a key-signed flight plan to the UAV to "unlock" the UAV's flight lock. A variety of mechanisms can be used to submit a flight plan request and to send an approved flight plan to a UAV, including having some of all of a smartphone's capabilities on board the UAV with the capability to directly communicate over a cellular network.

The RA server evaluates a UAV's proposed flight plan based upon the attributes of the O/O, attributes of the UAV, the location and time of the requested flight plan, and a set of flight rules and exclusion zones that are developed in consideration of and with the objectives of privacy assurance, security assurance, flight safety assurance (conflict/collision avoidance), and ground safety assurance (protecting people and property on the ground). The key-signed flight plan supplied to the UAV by the RA server specifies an inclusion zone that corresponds to a flight plan trajectory to be followed, which includes both spatial and temporal boundaries. Once in flight, the UAV maintains real-time knowledge of its position and time to ensure its flight remains within the approved inclusion zone. If a UAV crashes or causes damage, the UAV operations data kept by the RA server supports rapid identification of the O/O, e.g., via an electronic ID of the UAV, and accident reports can be made to the RA.

The above and still further features and advantages of the described system will become apparent upon consideration of the following definitions, descriptions and descriptive figures of specific embodiments thereof wherein like reference numerals in the various figures are utilized to designate like components. While these descriptions go into specific details, it should be understood that variations may and do exist and would be apparent to those skilled in the art based on the descriptions herein.

DETAILED DESCRIPTION

Aspects of the System

Figure 1:
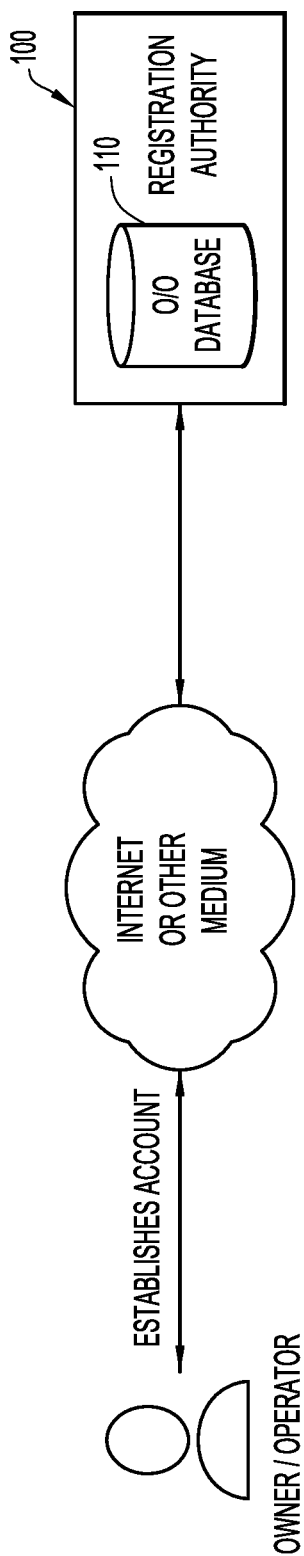
FIG. 1 is a block diagram conceptually illustrating an example implementation of a system that enables establishment of an Owner/Operator (O/O) account with a Registration Authority (RA).

The described system provides a registration process for UAVs with the following elements and controls.

(1) Every airspace has a Registration Authority (RA). The RA may have domain over UAVs operating in an entire country (e.g., the U.S. National Airspace System (NAS)), or there may be multiple RAs that cover the NAS in sections. The RA inherits its legal authority by being chosen as the management agent for a defined airspace by all the entities with legal authority over that airspace.

(2) UAV Owner/Operators (O/Os) establish an account with the RA. The O/O account has a user ID and password and is bound to authenticate identity of the O/O. This account is accessed, for example, via the Internet per standard logon procedures. Establishing an account requires certifying the identity of the O/O and may also require certification of training received for UAV operation.

(3) Levels of O/O Authority. There are multiple levels of O/Os that convey different levels of access to a range of airspaces. For example a local police department (PD) may register as an O/O and the level of access of the PD O/O will be greater than the access of an O/O that is operating for commercial purposes. A level of certified training or membership in a recognized association also enables an O/O greater access to defined airspaces. For commercial operations, one O/O may be exclusively allowed to conduct operations in a defined airspace, while others are restricted.

(4) Registering a UAV with the RA. A UAV O/O registers one or more UAVs with the RA. As part of registration, a UAV electronic ID (EID) is bound to the Owner/Operator via the user ID of the account. Registration data may include a unique name for the UAV, the UAV vendor and product name, its flight attributes, its communications and surveillance support, and its payload capabilities (e.g., the maximum payload weight). Other key UAV attributes may include such items as maximum speed, maximum altitude, and maximum time aloft as well as legal authority to conduct operations such as a Certificate of Waiver or Authorization (COA), FAA Section 333 approval of flight worthiness, or other future defined method for authorization. Registration of a UAV establishes the class of the UAV, and its attributes are used in the approval process of flight requests by the O/O to fly the UAV in a defined airspace.

(5) UAV design requirements. A UAV is designed with a virtual flight lock which resides with the onboard operating system (OS) that needs to be turned "off" in order for the UAV to take flight. The flight lock is "on" by default. One item needed to turn off the flight lock is a key-signed flight plan from the RA that allows a specific registered UAV (EID) to fly at a specified location (inclusion zone) in a specified time window. The concept of an inclusion zone granted to the UAV by the RA relieves the UAV of the burden of keeping track of the numerous static and dynamic exclusion zones. A UAV must also be designed with real-time access to an external time and positioning source (e.g., GPS), that verifies that the UAV is within the inclusion zone and time window contained in the "key." When the flight lock function verifies this condition, the lock is turned off and the UAV is enabled to fly at the command of the O/O. The UAV also has a tamper-proof barometric altimeter to support the accurate determination of altitude.

(6) Accurate determination of altitude. The conversion of barometric altitude, measured at the UAV, to geometric altitude is accomplished by providing the UAV with the current sea level barometric pressure at the UAV location. This can be conveyed authoritatively by the RA, but may also be provided in real-time from an authoritative source over a communications link. That link can be cellular LTE, eLoran, or some other link. Corrections are supplied with the key-signed flight plan at trajectory initialization and supplemented periodically for longer operation durations as well as updated on significant changes over time.

(7) Approval process to fly a UAV. A key-signed flight plan needed to enable UAV flight is obtained by the O/O making a request to fly a specified registered UAV in a specified inclusion zone and time window. This request is made by the O/O when logged onto its account with the RA. This request is the UAV analogue of filing a flight plan for conventional aircraft. If the RA approves the request, the RA signs the flight plan with its key and sends it to the O/O. The RA applies algorithms for providing a key-signed flight plan based upon the attributes of the O/O, attributes of the UAV, the location and time of the requested flight plan, and a set of flight rules and exclusion zones that are developed in consideration of and with the objectives of privacy assurance, security assurance, flight safety assurance (conflict/collision avoidance), and ground safety assurance (protecting people and property on the ground).

(8) Restriction of UAV flight to the inclusion zone. An inclusion zone is specified in the key-signed flight plan. Once in flight, the UAV maintains real-time knowledge of position and time. If the operator commands the UAV to go outside the inclusion zone, the UAV will resist. The boundaries of the inclusion zone are an invisible fence that the UAV will not cross. As the time window approaches expiration, the UAV will alert the O/O so that they will take action to end the flight. If the O/O does not respond, depending upon the UAV capabilities and the type of flight plan approved, the UAV will autonomously execute a safe landing. For example, if a visual line-of-sight plan was approved, the UAV will autonomously head home (the launch site) and land before the time window expires.

(9) Flight plan renewal. For flights of extended duration, a capability to renew flight plan authorization is necessary. While many cases of restricted airspace are static and constant, such as areas around national monuments, military operations areas, etc., other restricted airspaces will be temporary or time dependent. Examples of this may be that a restriction exists over a stadium during a sporting event, but not at other times. In this case, the UAV conducting an extended mission of greater than a specified time duration will be required to have the capability to communicate via LTE or similar technology to receive renewed authorization of flight plans.

(10) RA ability to selectively confine UAV via forced flight plan update. For UAVs equipped with the in-flight capability to renew flight plans, required for missions greater than a specified time duration, the RA has a mechanism to effectively confine the UAV to a specific airspace through a forced flight plan update. The RA may exercise this option in cases of emergency or if surveillance algorithms detect that the UAV is repeatedly and perhaps intentionally trying to fly in unauthorized airspace. This is accomplished by the RA issuing an updated flight plan to the in-flight UAV that confines it to a small amount of airspace, forcing it to hover, circle in a holding pattern, or land immediately. This action can be used in conjunction with an alert to the authorities to investigate the suspicious activity. Other uses for this function may be to allow for prioritized access of a distressed manned aircraft or UAV to traverse the airspace in order to land safely.

(11) Notice to Airmen (NOTAM) of UAV activity. When the RA approves a flight plan for a UAV, in accordance with approved rules, the RA will generate a NOTAM that alerts low-flying pilots of UAV activity. NOTAMS are reviewed in pilot pre-flight briefings and, in the case of the U.S. NAS, are also broadcast in real time in the U.S. from the Surveillance and Broadcasting System (SBS) over the 978 MHz Universal Access Transceiver (UAT) data uplink. A Digital NOTAM (d-NOTAM) capability is in development and is currently in various stages of deployment across the NAS. The d-NOTAM capability is able to depict areas of interest on a map in the cockpit, as opposed to shorthand text used in NOTAMs today. The d-NOTAM capability will allow the manned aircraft pilot to more easily discern NOTAMs which are applicable to his operation.

(12) Airspace surveillance for flight safety. The RA has a situational awareness (SA) of UAV operations throughout a defined airspace. Options for relaying UAV position in real time to the RA provide real time SA of UAVs in an airspace. This surveillance picture can be provided to entities with either a legal or curiosity interest. Such entities may include air traffic control facilities, police departments, and UAV hobbyists. Certain UAV flight plan types require the UAV to carry transponder equipment which will allow the UAV be tracked by surveillance sources. Options for transponder types include Mode S transponders, Automatic Dependent Surveillance—Broadcast (ADS-B) OUT transponders, or other to-be-defined technologies such as Long Term Evolution (LTE) technology. Other flight plans such as flights below a certain altitude (e.g., 500 feet above ground level (AGL)) and within visual line of sight (VLOS) may not require such technology, but may still require GPS position capability in order to discern UAV position as compared to authorized flight areas.

(13) Ground safety. The approval process for UAV flights takes into consideration the terrain, land use, buildings and other infrastructure, local events, as well as the attributes of the O/O and UAV to exclude the UAV from airspaces and altitudes that would pose a safety threat to people and property.

(14) Privacy protection. In order to protect privacy, an evolving set of rules and exclusion areas will need to be defined. The RA provides a UAV activity view over a network link such as the Internet based on the flight plans it approves and surveillance it collects. Property owners are able to view UAV activity over their property and may petition the RA for an exclusion zone that may be general or may be specific to an O/O. For example, the latter could effectively carry out a court mandate to exclude a convicted "stalker" from operating his or her UAV in defined locations.

(15) Security provision. The approval process for UAV flights is supported by a defined database of security exclusion zones that surround sensitive areas that deny access to all UAVs unless the O/O has defined authority (such as a federal enforcement agency) to fly in that zone.

(16) Support for accident/incident post mortems and corrective action. If a UAV crashes and causes damage, the UAV operations data kept by the RA supports rapid identification of the O/O. In addition, the EID of the UAV also identifies the responsible O/O, and accident reports can be made to the RA. A history of damage-causing crashes by an O/O will result in that O/O losing permission to fly UAVs, e.g., all of their UAVs may be de-registered. Similarly, if a particular model of UAV causes numerous accidents/incidents, that data is also captured and used by a regulatory authority to de-register that UAV until the UAV vendor provides an adequate problem analysis and fix.

In summary, the described system incorporates all the elements required for an aviation regulatory and management process, but does so in a way that imposes minimal impact on O/O time and minimal impact on the design requirements of UAVs. Each of the various aspects of the system will be described below in greater detail.

Description of the Registration Authority

Every airspace has a Registration Authority (RA). The RA may have domain over an entire country (e.g., the U.S. NAS), or there may be multiple RAs that cover the NAS in sections. The RA acts as the agent for all the legal authorities that have some control authority over a defined airspace. Thus, the RA is somewhat like a public utility run by a private company. As it is the agent of legal authorities, it is regulated by and beholden to these authorities. The primary way the legal authorities regulate the RA is through the specification of all the restricted airspaces and the rules of flight in all airspaces. The RA utilizes these rules in the flight plan approval process which processes requests to fly and provides key-signed flight plans to give flight approval. The RA registers O/Os and the UAVs that they fly. The RA determines whether the O/O has the authority to fly a specified UAV in a specific area. The RA uses the database of exclusion zones and rules of flight to process a flight request and to make an approval determination. The RA also has an accurate terrain database so that it can process requests with a precise understanding of the relationship between altitude above ground level and altitude above sea level.

The UAV rules of flight and exclusion zones constitute a very large and complex set of rules and data. Moreover, the flight rules are dynamic, as some restrictions are time dependent and, because the UAV industry is in its infancy, one would expect the rules to evolve over time to ensure that the right balances among security, safety, privacy, and the freedom to fly are maintained. It is clear that the data set of restricted areas and rules is far too complex to codify and keep current in each individual UAV.

Registration of UAV Owner/Operators

The described system requires Owners/Operators (O/Os) to establish an account with the Registration Authority (RA) 100, as illustrated in FIG. 1. O/Os may be public agencies, corporations, or individuals, for example. The O/O account has an associated user ID and account password and determines the authority and capability level of the O/O. The authority level is determined by the authority of the O/O (e.g., police, forest service, large acreage company, or hobbyist). For example, a police department would generally be authorized to fly above the ground of its jurisdiction, and a large landowner will have special privileges in the airspace immediately above its owned land. O/O capability is determined by the documentation of certified training.

The O/O's authenticated identity and other personal data including, for example, the user ID, the account password, and the training certification are supplied to the RA 100 via an O/O registration request message. Upon receiving the O/O registration request message, the RA 100 verifies the O/O identity, the skill level, and the level of access to the airspace, and establishes a unique user ID for the O/O.

The O/O account enables the O/O to register certified UAVs under the O/O account. This account is accessed, for example, via the Internet or other communication network per standard logon procedures. It will be appreciated that the described system is not limited to any particular user authentication mechanization or user ID and password scheme, and any of a variety of techniques for establishing and accessing a secure user account can be implemented. As will be described in greater detail below, the RA includes an O/O database 110 that stores the O/O's authenticated identity and other personal data.

Registration of UAVs

Figure 2:
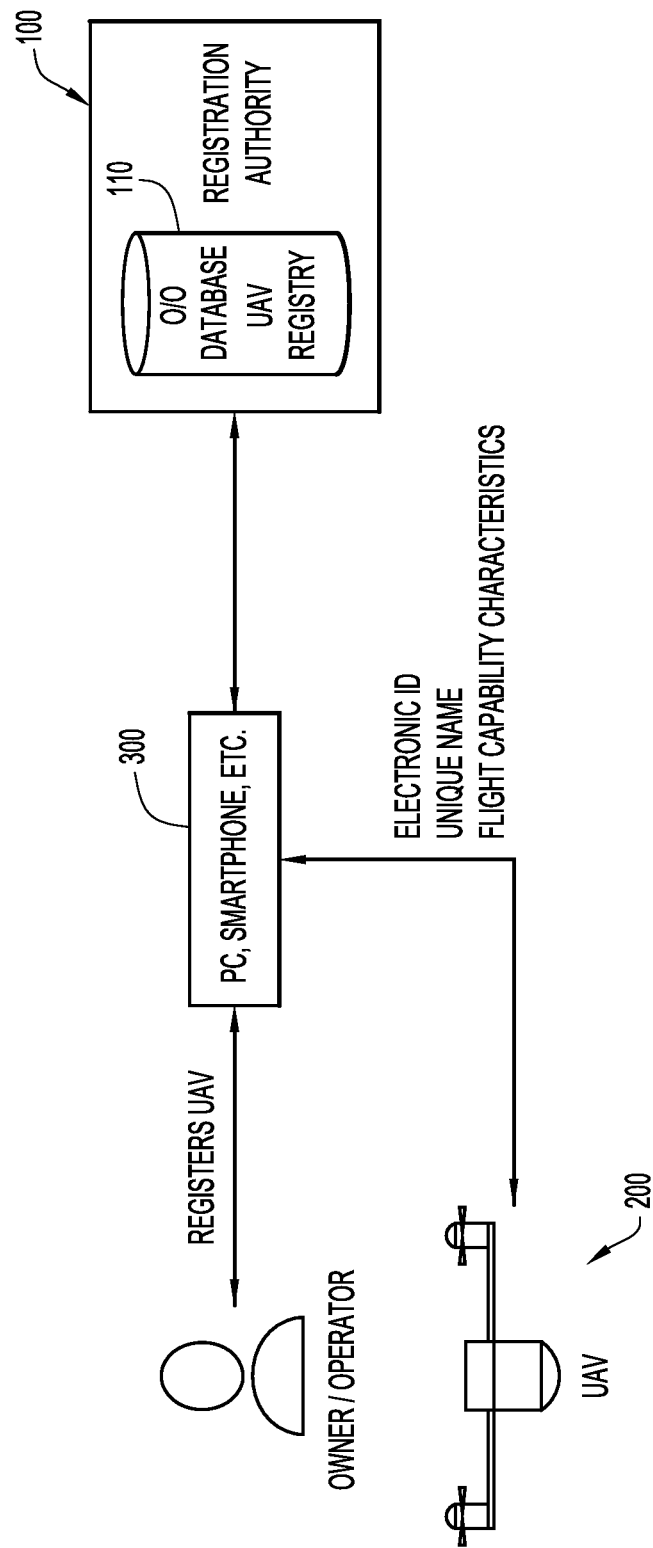
FIG. 2 is a block diagram conceptually illustrating an example implementation of a system that enables registration of a unmanned aerial vehicle (UAV) with the RA.

In order to support the overall management system, a UAV must be registered with the Registration Authority (RA) under an Owner/Operator (O/O) account. Registration is initiated by the O/O that has established an account with the RA by submitting a UAV registration request message to the RA. A registered UAV is bound to the identity and account of the O/O. FIG. 2 conceptually illustrates the registration of a certified UAV by an O/O. By way of example, the O/O provides the UAV Electronic ID (EID) assigned by the UAV manufacturer, a unique name chosen by the O/O, and flight capability characteristics of the UAV to the RA. This information may be manually entered by the O/O into the user interface of a user device 300, such as a smartphone, tablet, laptop computer, desktop computer or interface, or other graphical user interface (GUI).

According to another option, the UAV information can be automatically provided by the UAV 200 via a wireless or wired connection (e.g., Bluetooth, USB, Near-Field Communications (NFC), or other) between the UAV and a smartphone or other processing device 300. The O/O's processing device 300 (e.g., PC or smartphone) can communicate with the RA 100 to perform the UAV registration process over a communication link or network, such as the Internet, as previously explained. According to another option, the UAV 200 itself possesses the necessary processing capability, user interface, and/or communications and networking capabilities to allow the O/O to register the UAV with the RA directly via the UAV. For example, the UAV may possess some or all of the computing, user interface, security, and communications capabilities of a smartphone, as described in subsequent examples.

The RA 100 receives in one or more UAV registration request messages the UAV EID, the UAV vendor, model, flight characteristics, communications capability, surveillance support capability, payload carrying capacity and unique O/O chosen moniker, and registers the UAV in association with the O/O based on the captured information.

The EID is unique and tamper proof. It conveys the certification level of the UAV 200 as well as its flight capability and characteristics. The UAV name chosen by the O/O is also unique. It is colloquially the UAV avatar or "handle." A UAV O/O can register one or more UAVs with the RA 100. This process is analogous to registration of a cell phone. In cell phone registration, the Electronic ID is associated with a phone number and the owner. In a UAV registration, the Electronic ID is bound to the Owner/Operator, the User ID of the account, the avatar chosen by the O/O, the UAV Product name, and its flight and payload attributes.

UAV Design Requirements

In order to support the overall management system, each UAV must meet a minimum set of design requirements. Meeting these requirements is part of the UAV certification requirements. A UAV that does not meet a minimum set of design requirements will not be registered. Flying such a UAV (e.g., one without a flight lock) would be illegal. In consideration of the fact that any UAV with the capability to carry a payload as little as one pound can serve as a bomb delivery system, UAVs could eventually be widely perceived as threats if a few such incidents occur in the future. Thus, the imposition of design requirements is an important measure to establish the definition of a legal UAV whose ownership is established, whose flight plans go through an approval process by the RA, and whose geographic boundaries (inclusion zone) in the flight plan are enforced by the UAV design. A UAV must have an onboard operating system comprising an autopilot and the capability to coordinate or perform the following features and functions:

A UAV must have a tamper-proof Electronic ID (EID) embedded in hardware, similar to what is implemented in cell phones.

A UAV must have a tamper-proof position, navigation and time (PNT) capability sourced to an external public utility. The external source may be, for example, GPS, GPS and Cell Tower (like cell phones), eLoran, or other signals designated as suitable.

A UAV must have a tamper-proof barometric altimeter.

A UAV must have a flight lock that is on by default and that prevents the UAV from flying. In order to fly, the UAV flight lock must be turned off. To do this, the flight lock requires a digitally signed approved flight plan that specifies the UAV EID, region of airspace (inclusion zone), and timeframe that the UAV may fly. One example of a mechanism for specifying the inclusion zone is a set of values that define permissible latitude/longitude, altitude, range, and a time frame. More generally, any practical set of parameters that define the boundaries of a three-dimensional airspace and a timeframe can be used to define the inclusion zone.

For support of most beyond visual line of sight flight plans (BLOS), the UAV must be equipped with a "cooperative" transponder which allows real-time surveillance as tracked by the RA. Examples of such cooperative transponders may be ADS-B OUT, Mode S, satellite communications (SAT- COM), or other technology such as LTE-cellular tracking via a data channel or short message service (SMS).

For support of UAV flight plans beyond a specified duration, the UAV must be equipped with an LTE, cellular, or SATCOM communications capability which would allow it to receive in-flight flight plan renewals or updates in order to support extended operations, or intentional confinement by the RA.

Figure 3:
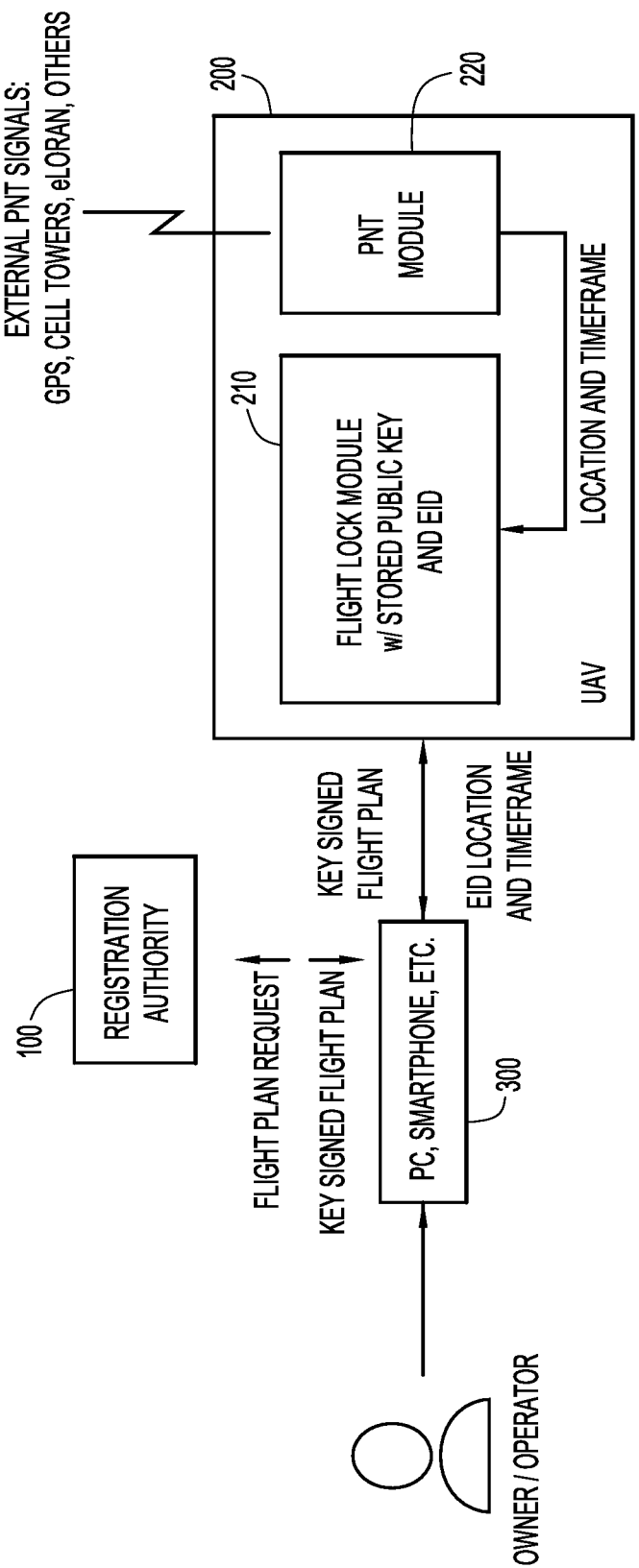
FIG. 3 is a block diagram conceptually illustrating an example implementation of a system that enables flight plan authorization involving a UAV flight lock design in which a key-signed flight plan is inserted externally.

FIG. 3 illustrates the concept of the flight lock and external key insertion, whereby the UAV 200 is given its key by the O/O via a smartphone or other processing device 300. This process assumes that the O/O made a prior request to the registration authority (RA) 100 and has received the signed flight plan from the RA 100. To make this request via a PC, smartphone or other device 300, the O/O logs onto the RA 100 with its user ID and makes a request to fly the UAV 200 (flight plan request) by UAV name, latitude/longitude, altitude, and timeframe, for example. The O/O also provides to the RA 100 data on the application and payload of the flight, e.g., commercial (agriculture, photos, video) or personal (photos, video, nothing). The RA 100 creates a key-signed flight plan that will turn the UAV flight lock off when the UAV 200 is in the inclusion zone and supplies the key-signed flight plan to the O/O device 300. This key-signed flight plan allows the UAV 200 to fly in a specific location and time. This scheme can be implemented by a private/public key pair, whereby the flight plan is signed (encrypted) with a designated private key owned by the RA 100. In this scheme, the encrypted plan is appended to the clear text plan.

As shown in FIG. 3, the UAV 200 includes a flight lock module 210 with a stored public key and EID, and a position, navigation, and time (PNT) module 220. The O/O sends to the UAV 200 the encrypted flight plan (key-signed flight plan) appended to the clear text flight plan. The UAV flight lock module 210 decrypts the encrypted flight plan with the stored public key (associated with the RA private key). The UAV flight lock module 210 compares the stored EID with the decrypted flight plan EID. The stored EID and the decrypted flight plan EID must match as a step in releasing the flight lock. Secondly, a match of the text result of the decryption to the clear text authenticates that that the RA 100 approved the flight plan. With both of the above matches, the UAV flight lock module 210 releases the flight lock, but only for the location and timeframe (i.e., the four dimensional "inclusion zone") specified in the flight plan. More specifically, the UAV's flight lock module 210 compares the flight plan location and timeframe with the location and time provided by the UAV's PNT module 220.

As shown in FIG. 3, the PNT module 440 wirelessly receives an external source of position, navigation, and timing signals such as GPS, terrestrial cellular signals from cellular towers, eLORAN, etc. For example, the PNT module may include a GPS antenna and receiver. If the location and time parameters match, the UAV 200 will provide a visual or other signal to the O/O that it is flight ready. The O/O then has flight control of the UAV 200 within the location and timeframe parameters of the flight plan.

Figure 4:
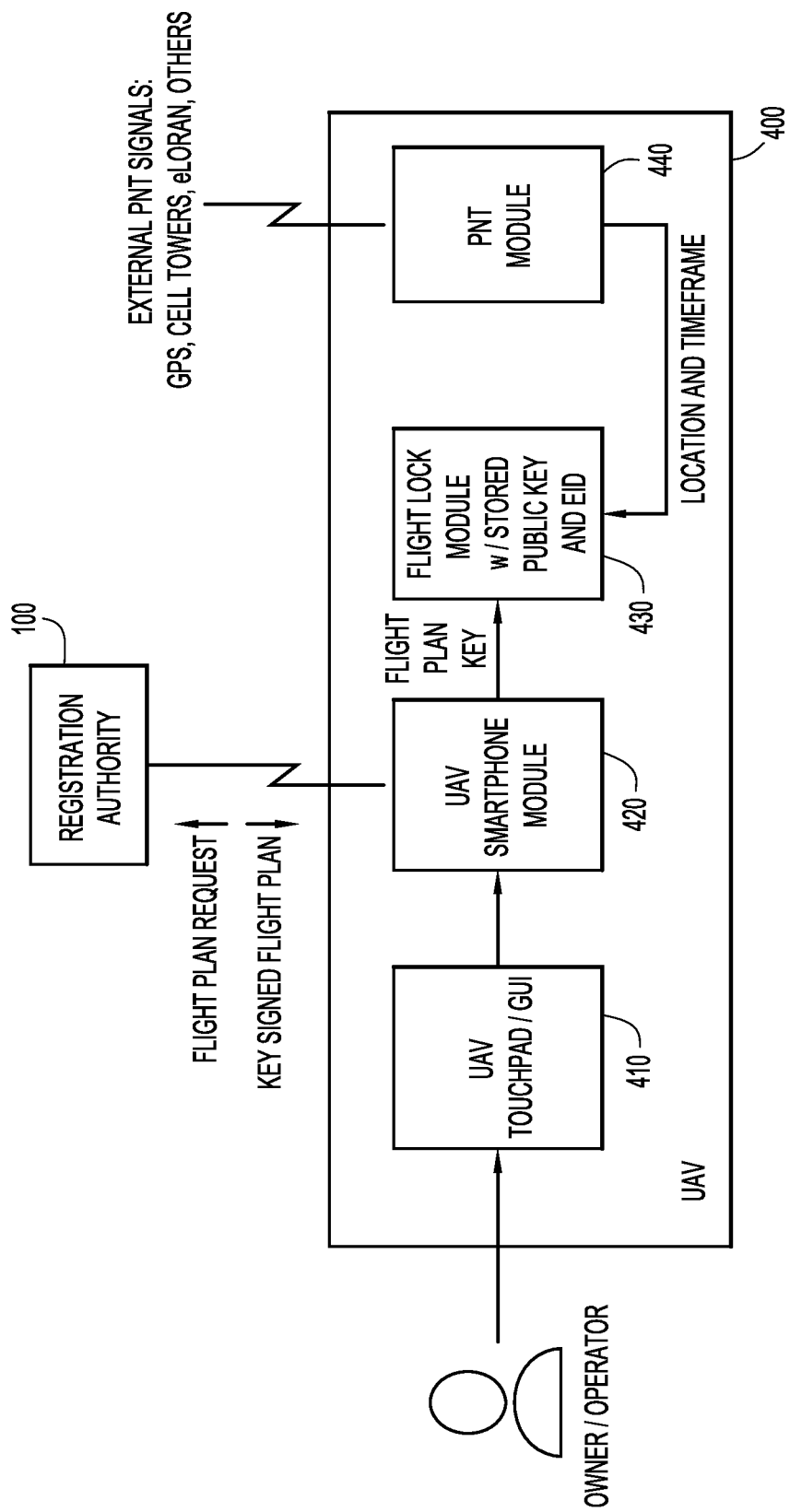
FIG. 4 is a block diagram conceptually illustrating an example implementation of a system that enables flight plan authorization involving a UAV flight lock design in which the key-signed flight plan is requested and received from the RA via a cellular network.
Figure 5:
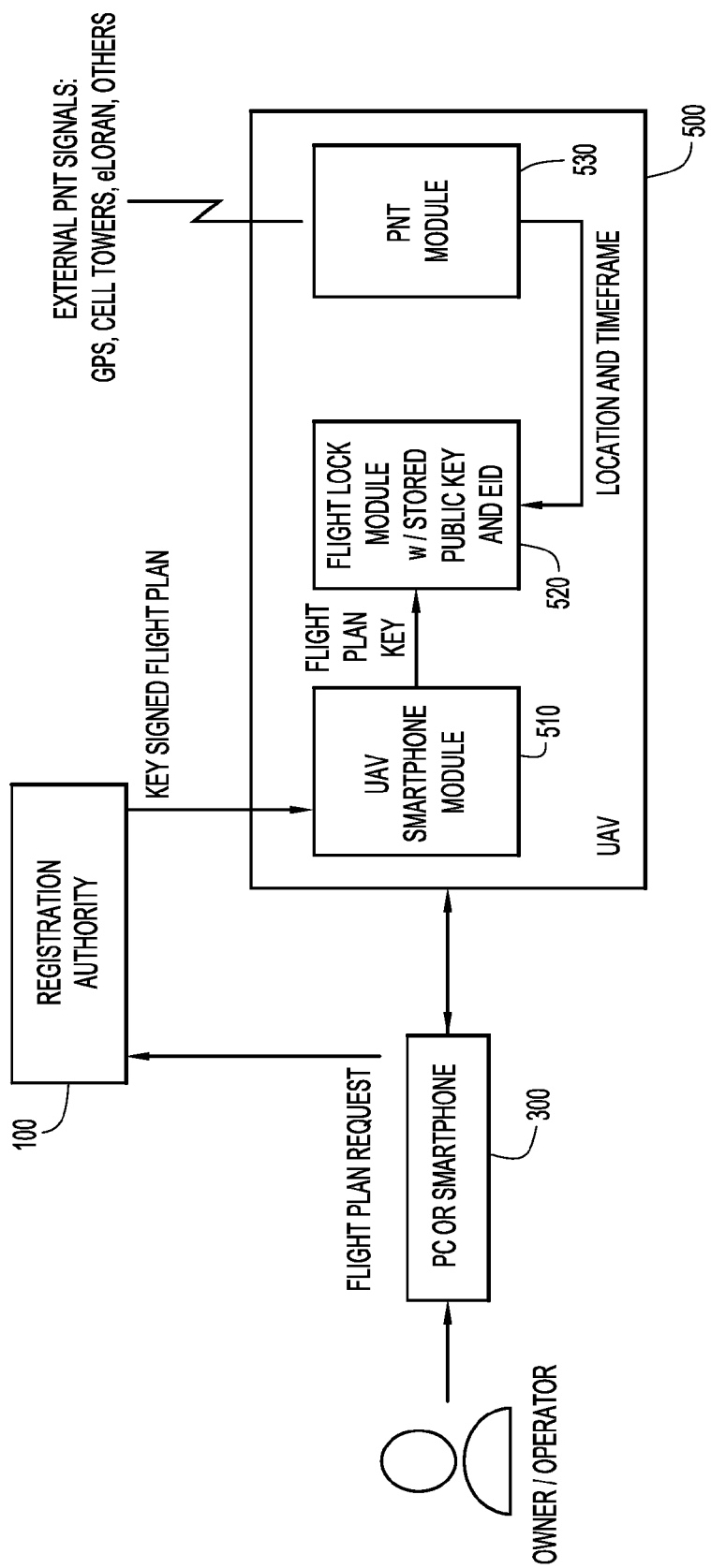
FIG. 5 is a block diagram conceptually illustrating an example implementation of a system that enables flight plan authorization involving a UAV flight lock design in which a key-signed flight plan is requested via an O/O device and the UAV receives the key-signed flight plan from the RA via a cellular network.

FIG. 4 illustrates the same concept shown in FIG. 3, but in a more capable UAV 400 that has smartphone capability embedded in the device. In this example, the UAV includes a touchpad/GUI 410 that may be wireless (e.g., Bluetooth) or a temporarily wired attachment of the UAV 400 to access the capabilities of the UAV smartphone module 420. The O/O uses the UAV touchpad/GUI 410 to request the flight plan from the RA 100. The UAV smartphone module 420 mediates this request. Specifically, the UAV 400 sends a flight plan request to the RA 100 over a cellular or other wireless network. Upon approval, the RA 100 sends the key-signed flight plan directly to the UAV 400 via the cellular/wireless network. Then, the UAV flight lock module 430 decodes the encrypted flight plan and checks to see that the flight plan EID matches the UAV EID, and that the public key decrypted flight plan matches the clear text flight plan. With both matches, the UAV flight lock module releases the flight lock but only for the location and timeframe specified in the flight plan. In a manner similar to the implementation shown in FIG. 3, the UAV's flight lock module 430 compares the flight plan location and timeframe with the location and time provided by the UAV's PNT module 440. If the location and time parameters match, the UAV 400 will provide a visual or other signal to the O/O that it is flight ready. The O/O then has flight control of the UAV 400 within the location and timeframe parameters of the flight plan FIG. 5 illustrates the same concept conducted another way with a UAV 500 that has a smartphone capability embedded in the device. In this implementation, using a smartphone or other processing device 300, the O/O requests the flight plan of the RA 100 via a communication network, such as the Internet or some other media, but the key-signed flight plan is sent by the RA 100 directly to the UAV 500 over the cellular or other wireless network. UAV 500 includes a communication module 510, which can be a "smartphone" module in that some or all of the capabilities of a cellular smartphone device may be included in the communication module 510. For example, communication module 510 may include a cellular antenna and receiver system capable of receiving wireless signals from a cellular network (e.g., from cell towers or local peer devices). The communication module 510 may include other features and capabilities of a smartphone, such as a cellular transmitter system, a memory and processor capable of storing and executing mobile applications (apps), a camera, a GPS antenna and receiver system, and a user interface including a touch screen display. According to one approach, the communication module 510 can be implemented as an actual smartphone mounted on the UAV. Optionally, some or all of the functions and capabilities of the UAV flight lock module and the PNT module can also be performed by the hardware and software of a smartphone mounted on the UAV.

Referring again to FIG. 5, as with the arrangements shown in FIGS. 3 and 4, the UAV flight lock module 520 decodes the encrypted flight plan with the public key and checks to see that the flight plan EID and the UAV EIDs match, and that the public key decrypted flight plan matches the clear text flight plan. With both matches, it releases the flight lock, but only for the location and timeframe specified in the flight plan. The UAV flight lock module 520 and PNT module 530 operate in essentially the same manner as the corresponding modules in the implementations shown in FIGS. 3 and 4.

UAV High Level Design

Figure 6:
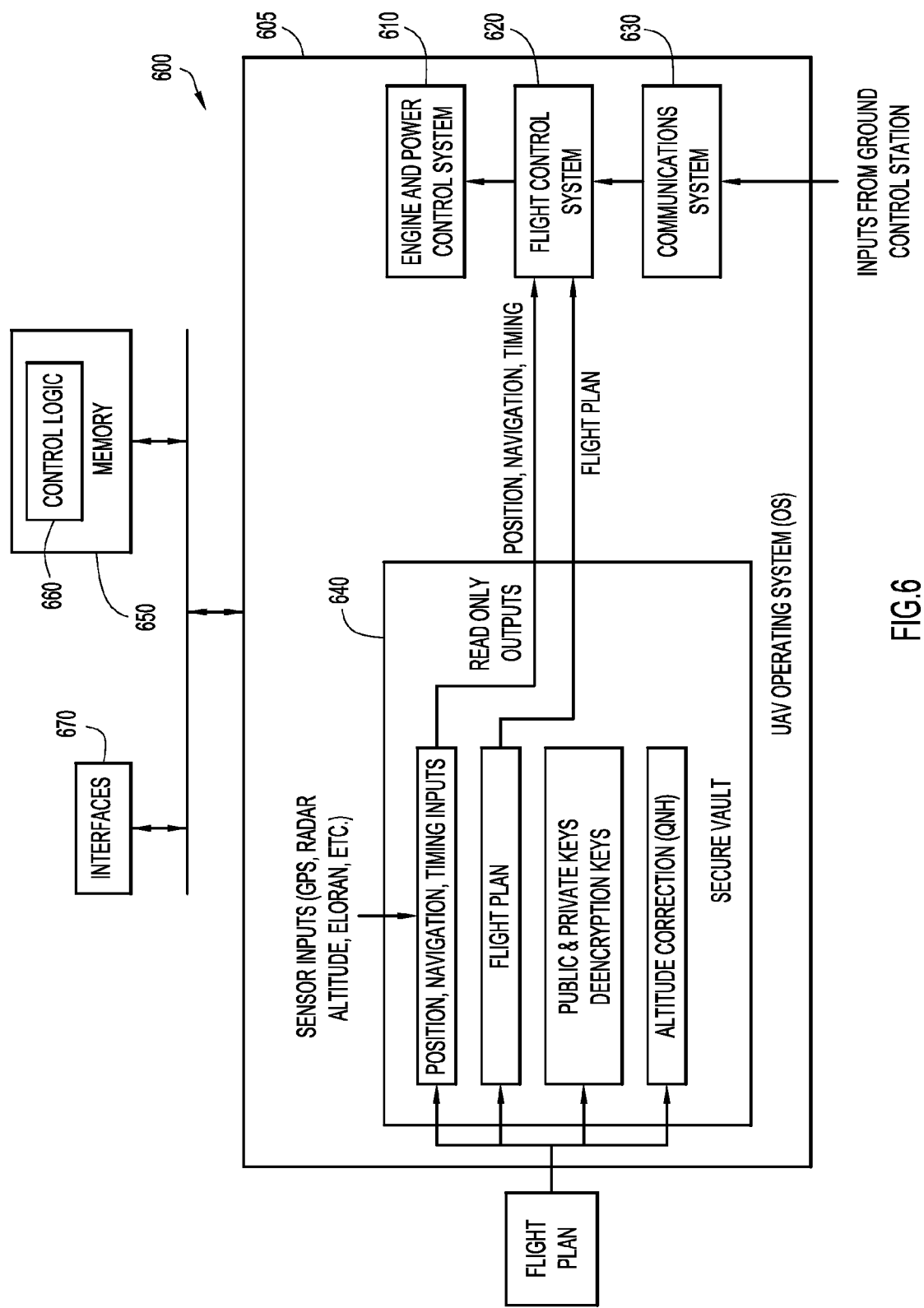
FIG. 6 is a block diagram conceptually illustrating an example of a UAV operating system (OS) capable of implementing flight lock functionality and flight plan adherence.

FIG. 6 is a block diagram illustrating an example implementation of the overall architecture of the operating system (OS) 605, including processing and memory capabilities that resides onboard the UAV 600 and enforces the flight lock functionality and adherence to the parameters of the approved and loaded flight plan. UAV operating system 605 includes one or more processors, such as microprocessors or microcontrollers, that execute instructions to perform the operations of the UAV described herein. For descriptive purposes, the processor(s) are represented by the various systems shown on the right side of the diagram in FIG. 6. These processors include: an engine and power control system 610, a flight control system 620, and a communications system 630. Engine and power control system 610 controls or monitors the available fuel and/or battery levels as well as the control and/or monitoring of engine performance. Flight control system 620 monitors and controls the control surfaces of the UAV. In the case of a multicopter platform, flight control system 620 and engine and power control system 610 may be implemented as a fully integrated common module. Communications system 630 functions as the command and control (C2) link to the UAS Ground Control Station. It will be appreciated that the representations of the processors shown in FIG. 6 are conceptual, and the operations performed by the various processors can be performed by a single processor device or by any number of combination of processor devices. Thus, as used herein and in the claims in the context of a UAV, the term "processor" refers generally to one or more processors or processing devices that perform the operations of one or more of the processors represented in FIG. 6.

Additionally, UAV OS 600 has a secure "vault" 640 which includes encrypted non-volatile memory that contains the key parameters that must be present for an approved flight plan to be executed. Secure vault contains secured data that is used by flight control system 604 to enforce the flight lock functionality and adherence to the defined flight plan. In particular, secure vault 608 contains the following data:
  Position, Navigation, and Timing (PNT) data. This data is received via onboard sensors such as a GPS receiver, radar altimeter, eLoran, etc.
  The flight plan, as approved by the RA, comprising 4D trajectories and/or volumetric parameters for flight.
  Public and private encryption and decryption keys for securely storing the contained data.
  Altitude correction parameters (QNH) that are used to correct altitude inputs for varying barometric pressure. This data may be optional for higher precision of altitude controls, and is loaded via the flight plan upload at launch time.

Secure vault 640 can be written to only via the flight plan loading process by utilizing the encryption enabled by the public and private keys. For the remainder of systems (e.g., engine and power control system 610, flight control system 620, and communications system 630), data from the secure vault is in a read-only format 640. The flight lock functionality is enforced by combination of secure vault 640 and flight control system 620. The flight lock may be a physical lock, a virtual lock, or a combination of the two. Flight control system 620 must receive from secure vault 640 the following items in order for the flight lock to be removed:
  Valid position, navigation, and timing inputs, such as GPS position. This information ensures that the UAV knows its own location prior to launch.
  Valid flight plan. This ensures the UAV knows where it is going in relation to its current position prior to launch.

If both of these parameters are present and valid, the flight lock is removed, enabling the UAV to accept inputs and launch successfully. If one or more of these inputs remains invalid or not present, the flight lock remains engaged, thereby preventing the UAV from launching.

In addition to secure vault 640, UAV 600 further includes one or more memory devices 650 to store a variety of other data and software instructions (control logic 660) for execution by the aforementioned processors. The one or more memory devices 640, 650 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 650 of UAV 600 may comprise one or more tangible (non-transitory) computer readable storage media (e.g., a memory device) encoded with software (e.g., control logic/software comprising computer executable instructions and, when the software is executed (by the processor(s) of UAV 600), it is operable to perform the operations described herein. In addition, the memory 640, 650 of UAV 600 may include the various data stores or databases shown to store data used and generated by the control logic 660.

Finally, UAV 600 includes a variety of external interfaces 670, such as those described in connection with FIGS. 2-5. As previously described, at least some of the various components of UAV (processors, memories, interfaces, etc.) can be implemented in a smartphone that is imbedded in or permanently or removably mounted on the UAV.

If the UAV is operated in autonomous mode, it flies within the bounds of its flight plan under control of the flight control system 620. If the UAV is under active control by the O/O, the flight control system 620 ensures that the UAV does not exceed the limits of its flight plan. For example, if the flight plan inclusion zone were defined as a region within five miles of a defined latitude/longitude pair, the flight control system 620 would not allow the O/O to fly outside that zone. If an O/O were to fly the UAV up to that boundary, the UAV would stop and hover until the O/O provides an allowed command. Similarly, as the time boundary of the flight plan is approached, the flight control system 620 autonomously returns and lands the UAV at its launch coordinates to avoid exceeding the time boundary.

Registration Authority High Level Design

Figure 7:
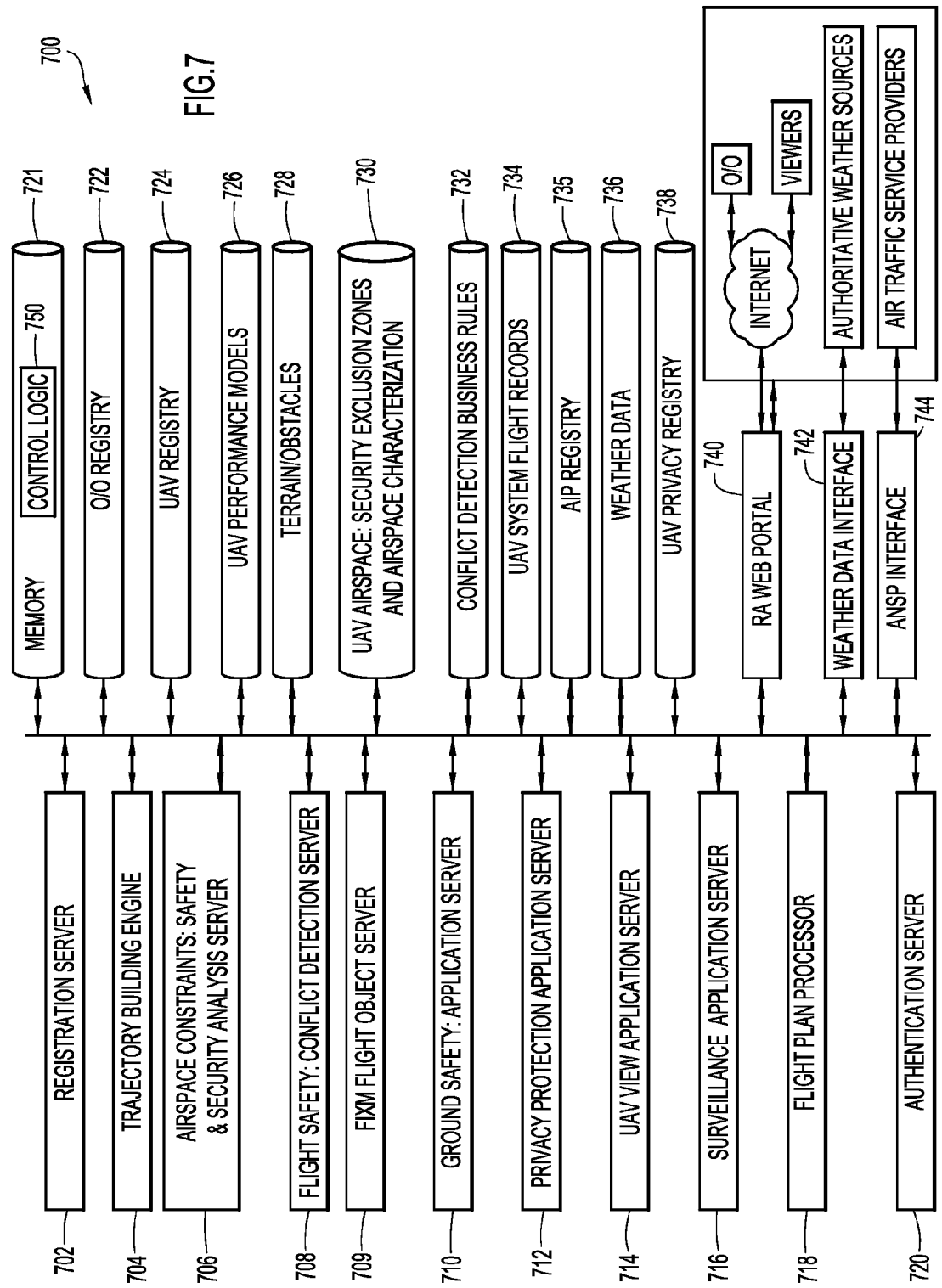
FIG. 7 is a block diagram conceptually illustrating an example high level architecture of a Registration Authority (RA) system.

FIG. 7 is a block diagram illustrating the high level architecture of an example registration authority (RA) server 700. RA server 700 (or simply "RA") includes one or more processors, such as microprocessors or microcontrollers, that execute instructions to perform the operations of the RA described herein. For descriptive purposes, the processor(s) are represented by the various servers and processors shown on the left side of the diagram in FIG. 7. These processors include: a registration server 702, a trajectory building engine server 704, an airspace constraints safety and security analysis server 706, a flight safety conflict detection server 708, a flight information exchange model (FIXM) flight object server 709, a ground safety application server 710, a privacy protection application server 712, a UAV view application server 714, a surveillance application server 716, a flight plan processor 718, and an authentication server 720. The UAV view application server 714 provides visual geographical displays of UAV operations within the airspace managed by the RA. The surveillance application server 716 tracks the location of UAVs in real time base on surveillance inputs provided by UAVs with the capability to provide surveillance. Operations of the other processors/servers will be described below in greater detail. It will be appreciated that the representations of the processors (servers) on the left side of FIG. 7 are conceptual, and the operations performed by the various processors/servers can be performed by a single processor device or by any number of combination of processor devices. Thus, as used herein and in the claims in relation to the RA server, the term "processor" refers generally to one or more processors or processing devices that perform the operations of one or more of the processors/servers represented in FIG. 7.

RA server 700 further includes one or more memory devices to store a variety of data and software instructions for execution by the aforementioned processors. The one or more memory devices are represented on the right side of the diagram of FIG. 7 as a memory 721 for storing control logic 750 and a number of static and dynamic databases relevant to UAV operations. These databases include: an O/O registry database 722, a UAV registry database 724, a UAV performance models database 726, a terrain/obstacles database 728, a UAV airspace: security exclusion zones and airspace characterization database 730, a conflict detection business rules database 732, a UAV system flight records database 734, an AIP Registry 735, a weather data database 736, and a UAV privacy registry database 738.

The one or more memory devices represented on the right side of FIG. 7 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory of RA server 700 may comprise one or more tangible (non-transitory) computer readable storage media (e.g., a memory device) encoded with software (e.g., control logic/software comprising computer executable instructions and, when the software is executed (by the processor(s) of RA server 700), it is operable to perform the operations described herein. In addition, the memory of RA server 700 includes the various data stores or databases shown to store data used and generated by the control logic.

In the lower left-hand corner of the diagram of FIG. 7 are the external interfaces of RA server 700 (e.g., a network interface card or multiple network interface cards) to the Internet or other communication network to O/O and viewers (RA web portal 740), the interface to authoritative weathers sources (weather data interface 742), and the interface to the applicable air navigation service provider (ANSP interface 744). As previously described in connection with FIGS. 3-5, the interfaces of RA server 700 include an interface to receive messages from an O/O device and/or a UAV, such as registration and authentication messages, flight plan requests, in-flight telemetry, etc., and an interface to send messages to an O/O device and/or a UAV such as key-signed flight plans, confirmation messages, in-flight instructions, etc. The interface to receive and the interface to send can be a single interface or separate interfaces and may either directly or indirectly involve transmission and reception of messages over a terrestrial cellular network. The functions of the application servers and databases will be described in the various logic flow diagrams below.

Filing a UAV Flight Plan and Getting Approval

Figure 8:
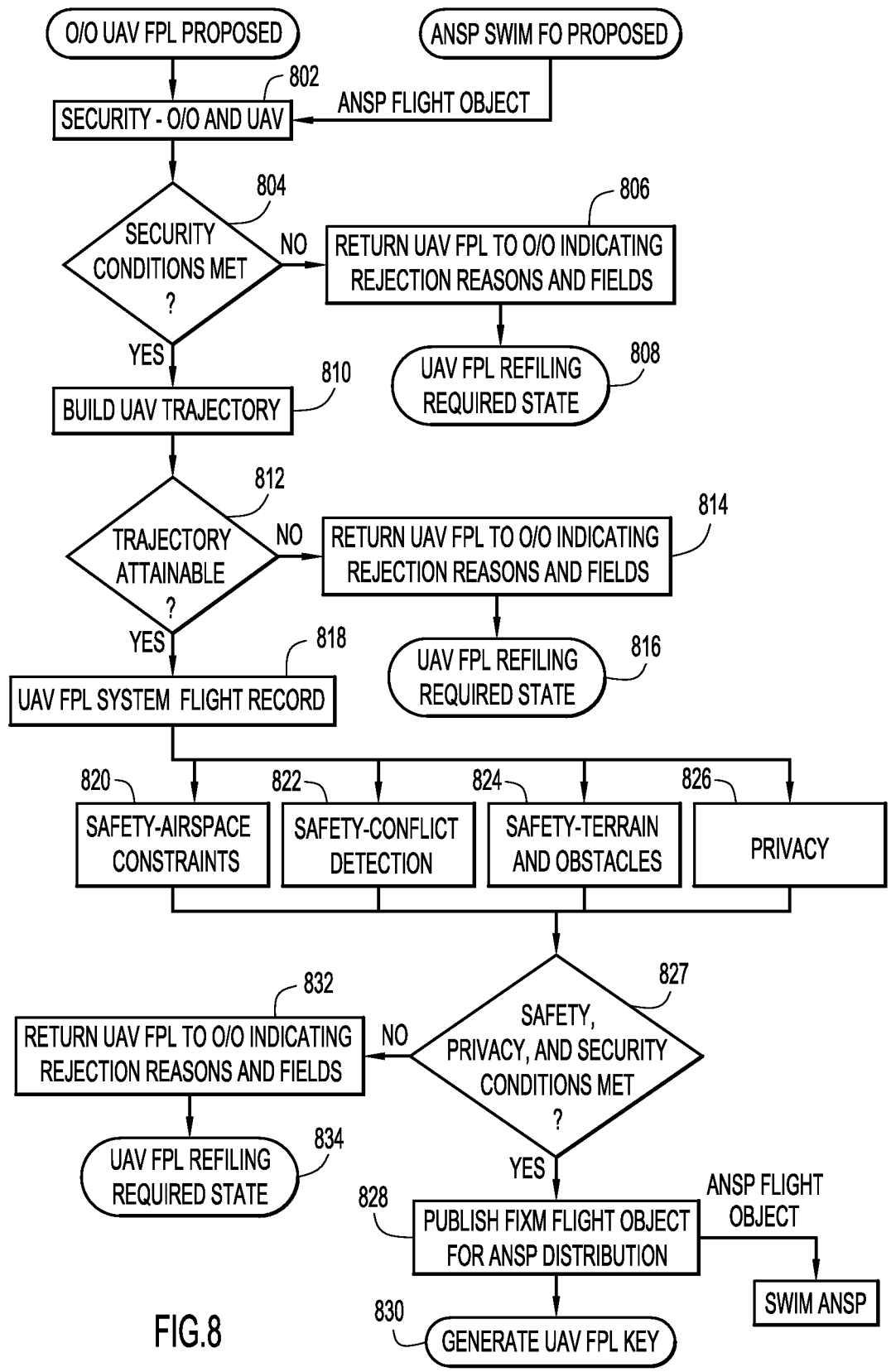
FIG. 8 is a flow diagram illustrating an example of UAV high level flight plan processing.

FIG. 8 describes the high-level logic implemented by the RA flight plan processor 718 for processing a flight plan request. The request is subject to a number of inspections that collectively ensure that security, flight safety, ground safety and privacy are assured. As previously described in connection with FIGS. 1 and 2, both the owner/operator (O/O) and the UAV must register with the registration authority (RA) prior to submitting a proposed flight plan. In operation 802, the RA, specifically registration server 702, inspects the O/O and UAV registry to ensure both are registered and are qualified to fly the requested type of flight plan, as described in greater detail in connection with the flow diagram of FIG. 9. Also in operation 802, all air navigation service provider (ANSP) system wide information management (SWIM) flight object (FO) publications are evaluated by the RA for UAV equipment types, applying the same rules for UAV flight plans filed directly to the RA by the O/O. In operation 804, if the security conditions evaluated in operation 802 are not met, processing flows to operation 806, where the RA sends a flight plan rejection message to the O/O user device (e.g., smartphone, computer, or the UAV itself) indicating the reasons for rejection (e.g., via specific fields in the returned flight plan message). As indicated in operation 808, receipt of the flight plan rejection message places the UAV in a "flight plan refiling required" state, essentially returning the flow to operation 802 in FIG. 8.

If in operation 804, the RA determines that the security conditions evaluated in operation 802 are met, the process proceeds to operation 810 in which the RA, specifically the trajectory building engine 704, builds the UAV trajectory from the flight plan. In operation 812, if the RA determines that the trajectory is not attainable (as described in greater detail below), processing flows to operation 814, where the RA sends a flight plan rejection message to the O/O user device indicating the reasons for rejection, and the UAV is placed in a "flight plan refiling required" state (operation 816) as previously described in connection with operations 806 and 808. If the RA determines in operation 812 that the UAV trajectory is attainable, processing flows to operation 818 where the RA generates a UAV flight plan system flight record that defines the four dimensional space (three-dimensional spatial region and a time window) that the UAV will occupy, as described in greater detail in connection with the flow diagram of FIG. 10.

As shown in FIG. 8, the flight record is the basis for four other follow-on checks relating to exclusion zones: safety-airspace constraints 820; safety-conflict detection 822, safety-terrain and obstacles 824; and privacy analysis 826. An exclusion zone is a defined volume of airspace that has restriction attributes that may deny and O/O or class of UAVs from flying in that air space. For example, an exclusion zone may deny access to all O/O below a defined level of access authority or all UAVs that do not meet a defined set of flight and other characteristics. According to another example, an exclusion zone may denied access to all O/O by default, but may be allow access to a selected set of O/Os by user ID.

Safety-airspace constraints 820 essentially involve security and flight safety assurance via analysis of airspace constraints, as described in detail below in connection with the flow diagram of FIG. 11. Safety-conflict detection 822 relates to conflict flight safety assurance via conflict detection (with UAVs and with conventional aircraft), as described in detail below in connection with the flow diagram of FIG. 12. Safety-terrain and obstacles 824 comprises ground safety assurance via analysis of UAV trajectory versus databases of terrain, buildings, and other obstacles, as described in detail below in connection with the flow diagram of FIG. 13. Privacy analysis 826 relates to privacy assurance via analysis of airspace exclusions for privacy that may be assigned to airspaces and conditions placed on the O/O, as described in greater detail below in connection with the flow diagram of FIG. 14.

After completion of the exclusion zone checks 820, 822, 824, and 826, in operation 827, the RA determines whether the safety, privacy, and security conditions have been met. If so, i.e., only if the outcomes of all of the above processes 820, 822, 824, and 826 do not violate any conditions, in operation 828 the RA digitally signs the flight plan by encryption with its private key, appends this to the clear text flight plan, and sends the key-signed flight plan to the O/O or UAV as previously described. In operation 828, the RA also sends the UAV flight plan to its flight object server (FOS) for SWIM ANSP publication distribution to each air traffic control (ATC) unit area of interest (AoI) volume intersected in trajectory, or makes a contribution to the flight object owner with any incompatibilities integrated for the RA segment(s) of the 4D trajectory. Importantly, if the O/O files a UAV flight plan directly to the RA with a trajectory that penetrates any active ATC Area of Responsibility (AoR), the flight plan may be returned to the O/O for refiling. The O/O may either modify the trajectory to avoid any active ATC AoR or file the flight plan directly with the ANSP. If the RA determines in operation 827 that any of the conditions required by operations 820, 822, 824, and 826 are not met, then processing flows to operation 832, where the RA sends a flight plan rejection message to the O/O user device indicating the reasons for rejection, and the UAV is placed in a "flight plan refiling required" state (operation 834) as previously described in connection with operations 806 and 808.

While the approval logic for a flight plan can be very complex, the decision rules are digitally captured, and the processing is automated, so the turn-around time required for approval can be less than 5 seconds.

Figure 9:
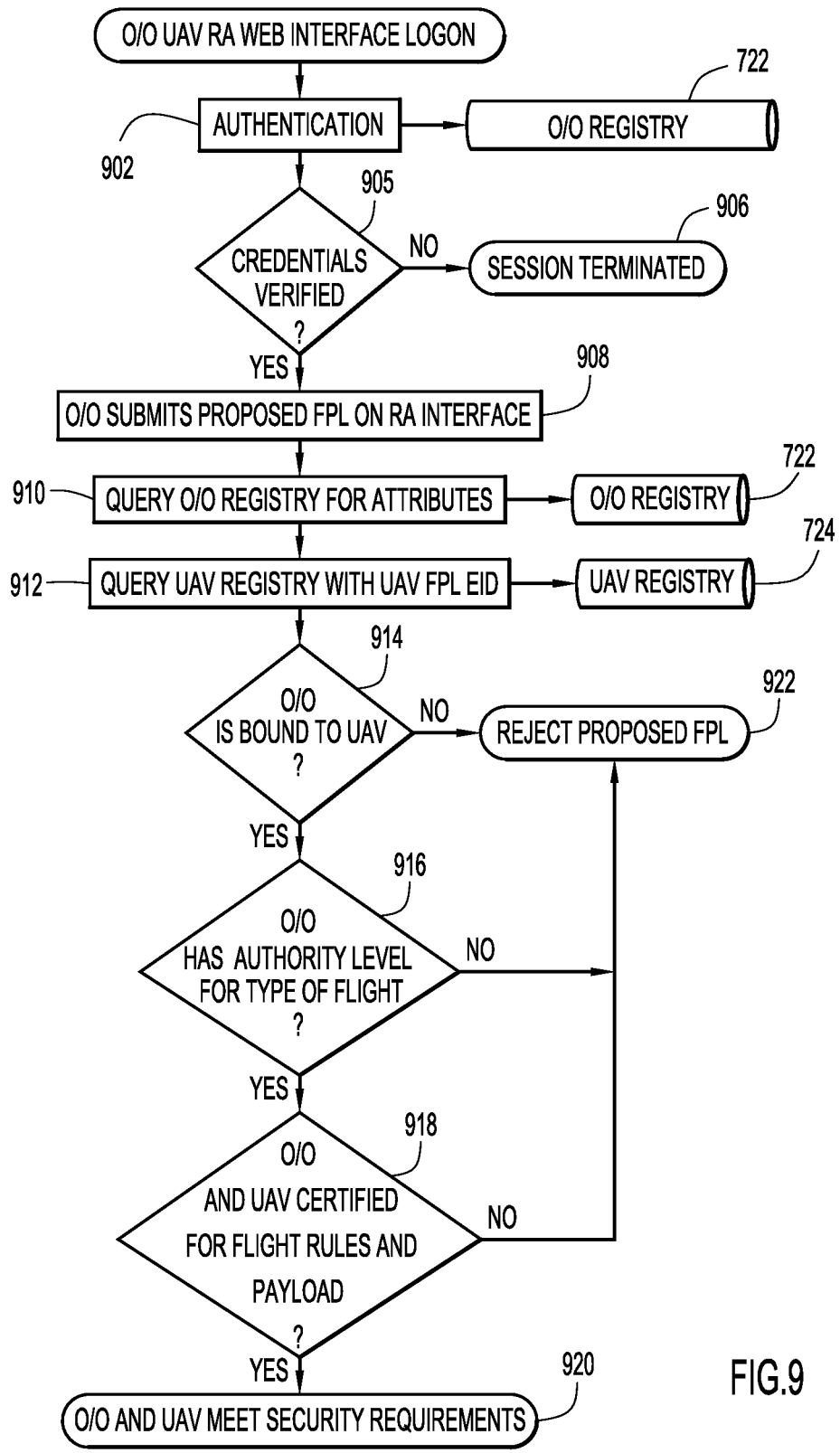
FIG. 9 is a flow diagram illustrating the O/O and UAV security inspection process according to an example implementation.

FIG. 9 is a flow diagram illustrating the process followed by the RA authentication server 720 (FIG. 7) for security inspection of the O/O and UAV associated with a flight plan request. Prior to ever filing a flight plan, a UAV O/O is required to register as a valid O/O with the RA. This process requires the O/O to submit to the RA, via an online form for example, the appropriate paperwork and identification information. Commercial operators must also include appropriate licensure documentation and other documentation such as certificates of waiver or authorization (COAs), Section 333 exemptions, or other required authorization documentation. This information is initially processed by the RA's registration server 702 and captured in the O/O Registry 722 (FIG. 7) of the RA. Unique logon credentials are generated and stored within the O/O registry 722, as shown in FIG. 9. The RA provides the O/O with the logon credentials by which to file future flight plans.

Likewise, all UAVs are required to be registered with the RA. UAV registration information requires performance parameters, registration "tail numbers," serial numbers, and flight characteristics. Additionally, when appropriate, flight airworthiness certifications will also be captured. For commercial off-the-shelf (COTS) UAVs, the OEMs will work with the RA to pre-populate the flight characteristics, airworthiness certificates, and payload options into the RA database to simplify the process when an O/O registers a UAV. This data is processed by the registration server 702 and captured in the UAV Registry 724 (FIG. 7). This UAV registration must occur prior to filing a flight plan.

The relationship between O/O and UAV may be one to one, one to many, or many to many. A single O/O may have one or more UAVs registered. Likewise, a single UAV may be registered to one or more O/Os.

To file a flight plan with the RA, the O/O uses the provided credentials to log into the RA interface via computer, smartphone, or other internet connected device, as previously described. Referring to FIG. 9, in operation 902, the RA authentication server 720 verifies the O/O credentials by comparison to the credentials stored in the authentication registry 904. If the RA determines in operation 905 that the credential check failed, the RA rejects the O/O from the system in operation 906 and the session is terminated. If the RA determines in operation 905 that the credential check passed (credentials verified), the processing proceeds to the flight plan submittal stage, beginning with operation 908.

Once the RA receives the flight plan submitted by the O/O via the RA interface (operation 908), the RA respectively accesses the O/O Registry 722 and the UAV Registry 724 in operations 910 and 912 to verify that the specific O/O is authorized to operate the specific UAV. If this is not the case, the RA rejects the flight plan (operation 914). According to an example implementation, the O/O registry 722 includes at least: the owner account ID, a unique ID, an authority level (e.g., search and rescue (SAR), police, forest service, hobbyist, etc.), certifications, and altering and emergency contacts. Similarly, the UAV registry 724 may include at least: the owner account ID, the UAV electronic ID (EID), a unique name, certifications, and the type of UAV (model number). The O/O Registry 722 is referenced to ensure that the O/O has the authority to fly the specific flight plan requested. A specific route may be reserved for specific purposes, for example, a pipeline inspection. If an O/O attempts to file a flight plan which resembles a route designated as a pipeline inspection route, and the O/O registry does not indicate that the O/O is authorized to fly this route, the RA system will reject the flight plan.

The O/O and UAV registries are referenced to ensure they conform to existing flight rules and payload rules. The following are examples:
  The O/O may only be authorized to fly daytime operations, and the flight plan requested is for night operation.
  The flight plan duration may exceed the fuel and performance capabilities of the registered UAV.
  Weather forecasts/conditions stored in weather database 736 indicate grounding of UAVs under a specific size.
  The UAV payload may consist of sensor equipment which is prohibited over a specific geographic region of the flight plan.

As shown in FIG. 9, in operation 914, the RA determines (verifies) whether the O/O is bound to the UAV. In operation 916, the RA determines (verifies) whether the O/O has the authority level for the UAV flight plan type of flight. In operation 918, the RA determines (verifies) whether the O/O and the UAV are certified for the UAV flight plan flight rule and payload. If all of the above conditions pass, then the O/O and UAV pass the security checks of the flight plan (operation 920). If any of the conditions assessed in operations 914, 916, and 918 are not met, in operation 922, the RA rejects the proposed flight plan and either a detailed description of the failure conditions is returned to the O/O, or alternate flight plans are suggested.

The flow diagrams of FIGS. 10A-10D illustrate the detailed processing performed by the RA's trajectory building engine 704 to build the UAV flight record from the flight plan request received from the O/O. The RA UAV flight data processing system applies trajectory-based operations principles in two constructs: volumetric trajectory and four dimensional (4D) trajectory. A volumetric trajectory defines a geographically fixed volume that physically contains the UAV operation in four dimensions. A 4D trajectory defines the UAV path of flight in terms of trajectory change points with containment deviation tolerances that define the UAV's lateral, longitudinal, and vertical motion for the operation.

The RA receives a flight plan proposal from the O/O (operation 1002). According to an example implementation, a typical flight plan includes the following information:
  O/O identification;
  UAV EID;
  global unique flight identifier (GUFI) assigned by the RA or ANSP;

route segments and, for each route segment, the route type;

flight plan status (e.g., proposed, filed, refiling required, scheduled, airborne, completed, canceled);

flight rules (e.g., visual line of sight (VLOS), radio frequency line of sight (RFLOS), Linear Low Altitude (LLA), Grid Low Altitude (GLA), autonomous trajectory, etc.);

type of flight (e.g., search and rescue (SAR), commercial, agriculture, photos);

payload type (e.g., industry/application: agriculture, law enforcement; payload: video, imagery, spectrum, resolution, etc.)

emergency condition rules filed by O/O (base coordinates).

Figure 10A:
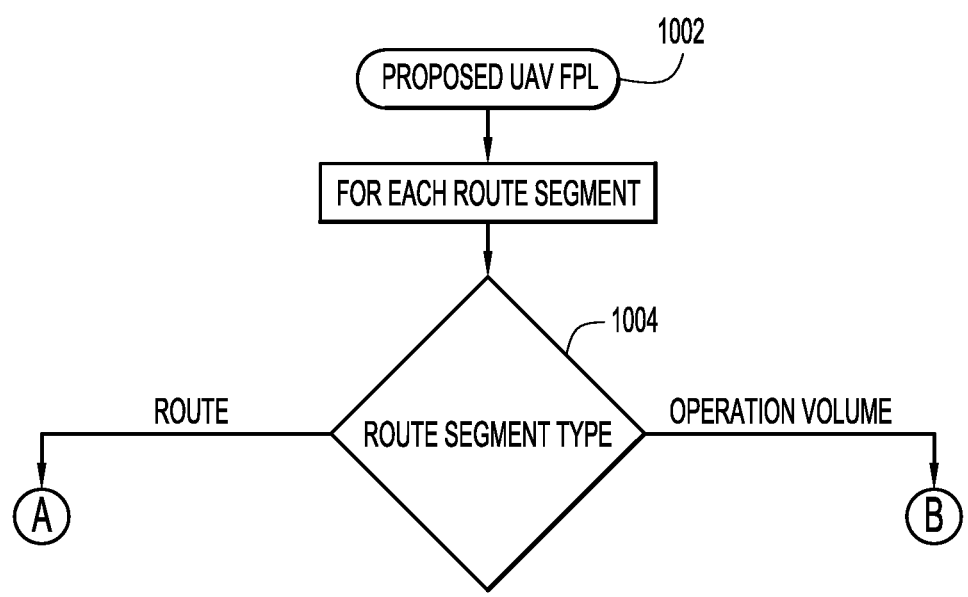
FIGS. 10A-10D depict a flow diagram illustrating the process of building a UAV trajectory (flight record) from a flight plan request according to an example implementation.

The flight plan specifies for each route segment one of two segment types: "operation volume" and "route." As shown in FIG. 10A, for each route segment received in the O/O's flight plan proposal, the RA determines in operation 1004 whether the route segment type is "route" or "operation volume," where the "route" segment type results in the processing shown in FIG. 10B involving building a 4D trajectory, and the "operation volume" segment type results in the processing shown in FIG. 10C involving building a volumetric trajectory. For an operation volume proposal, the O/O can, for example, visually define an operation volume polygon on a web interface map and sets the entry/exit times. For a route proposal, the O/O can, for example, visually define a sequence of timed waypoints on the web interface map. The O/O may then connect the route segments for flights that transition between 4D trajectory segments and volumetric trajectory segments.

Figure 10B:
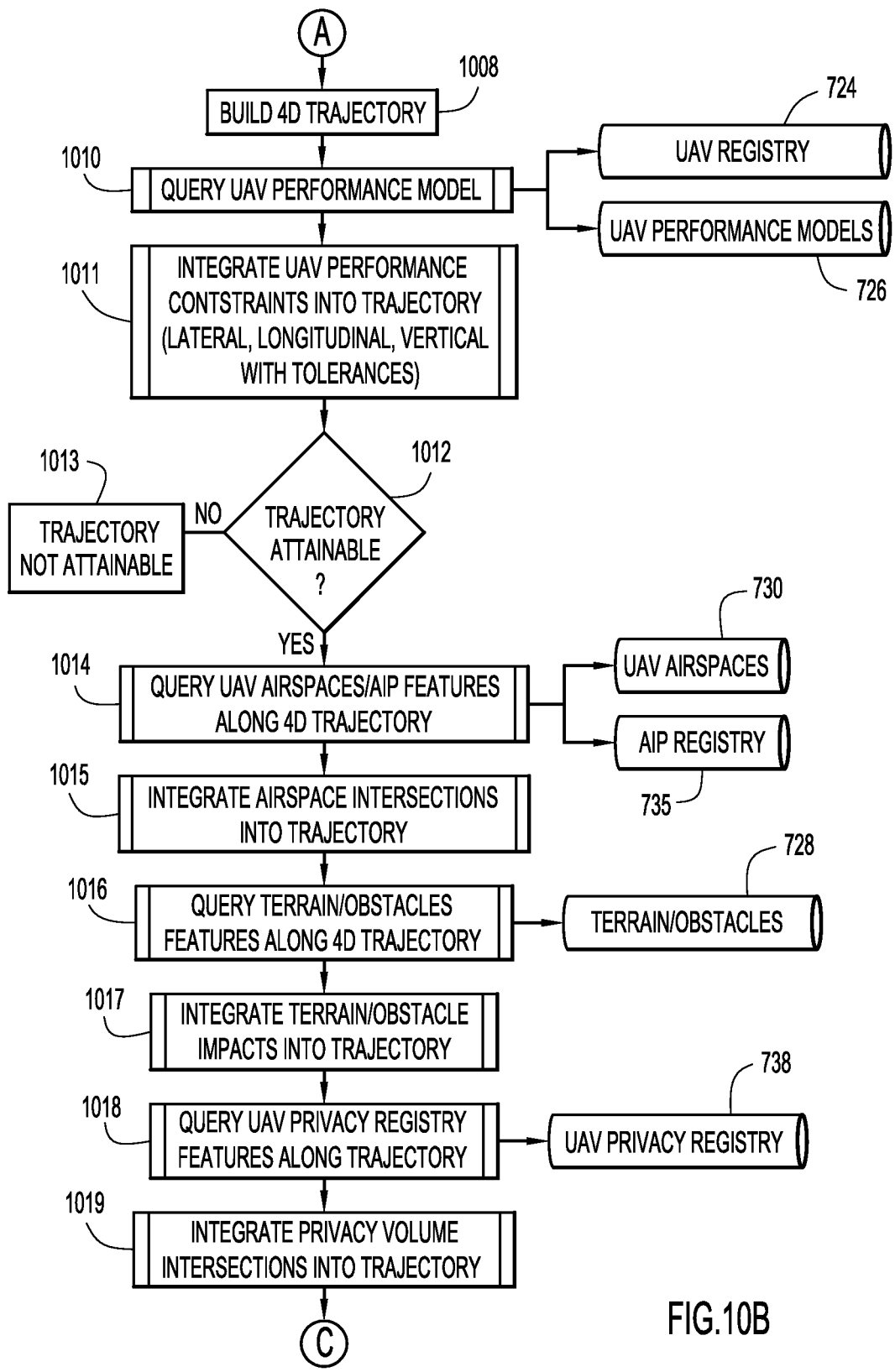

FIG. 10B shows an example of the processing involved in building a 4D trajectory from a proposed trajectory (operation 1008). According to an example implementation, the 4D trajectory includes:

latitude, longitude, altitude, and estimated time of arrival (ETA) trajectory change points and tolerances;

RA adds/updates points based on UAV performance model, including lateral longitudinal, and vertical tolerances;

RA adds points for UAV airspace/aeronautical information publication (AIP) airspace intersections, state assigned for O/O, UAV and mission access privileges;

RA adds points for terrain/obstacle warnings;

RA adds points for exclusion privacy volume impacts; and

RA adds points for conflict detection events.

Building the 4D trajectory initially involves querying the UAV Registry 724 and UAV performance model 726 in operation 1010. In this process, the UAV's manufacturer's performance criteria are applied to validate that the UAV is capable of meeting the conditions in the proposed trajectory. In operation 1011, the UAV performance constraints are integrated into the trajectory (lateral, longitudinal, and vertical with tolerances). In operation 1012, the RA determines whether the UAV is capable of attaining the proposed trajectory. If the UAV is not capable of attaining the proposed trajectory, in operation 1013, the RA returns the flight plan proposal to the O/O with performance constraints integrated into the trajectory to assist refiling.

If, in operation 1012, the RA determines that the trajectory is attainable, in operation 1014, the 4D trajectory is then subjected to volumetric intersection filtering through query to the UAV airspace volume registry 730 and the air navigation service provider (ANSP) airspace volumes data store (AIP Registry 735). The UAV airspace volume registry 730 contains airspaces owned and defined by the RA and, according to an example implementation, includes:

airspace unique ID;

owner account ID;

emergency contact(s) (alert distribution);

horizontal geographical scope;

ceiling rule (e.g., 400' above ground level (AGL), 300' mean sea level (MSL));

capacity constraints;

navigation, communication, and surveillance requirements for UAV equipment;

type of UAV requirements;

type of flight requirements (e.g., commercial, police, survey, SAR, etc.);

flight rules constraints;

payload constraints;

flexible use of airspace temporal models; and airspace access list—O/Os that have been granted access privileges by the airspace owner.

According to an example implementation, the ANSP airspace volumes data store includes:

AIP aeronautical information exchange model (AIXM) database and services;

service of local ANSP; and source of NOTAMs, temporary flight restrictions (TFRs) and special use airspaces (SUAs) and air traffic control (ATC) airspaces.

In operation 1015, each intersecting volume along the trajectory is integrated into the 4D trajectory by unique ID and entry/exit time for later compatibility evaluation. The 4D trajectory is then used in operation 1016 to geographically query the terrain/obstacles model 728. According to an example implementation, the terrain/obstacles model 728 can include digital terrain elevation data (DTEDS) supplemented with obstacles, including safety margins that are applied and stored. In operation 1017, each terrain/obstacle minimum safe altitude warning along the trajectory is integrated into the 4D trajectory by entry/exit time for later ground safety evaluation.

The UAV privacy volumes registry 738 is then queried in operation 1018 for the 4D trajectory, and each intersecting privacy volume along the trajectory is integrated into the 4D trajectory in operation 1019 by entry/exit time and unique ID for later compatibility evaluation. The UAV privacy volumes registry 738 contains exclusion volumes for property owners and, according to an example implementation, includes:

privacy volume unique ID;

owner account ID;

emergency contact(s) (alert distribution);

horizontal geographical scope;

ceiling rule (e.g., 400' AGL, 300' MSL);

type of flight constraints;

flight rule constraints;

payload type constraints;

flexible use of airspace temporal models;

denied list—list of O/Os without access privileges; and airspace access list—O/Os that have been granted access privileges by the privacy volume owner.

Figure 10C:
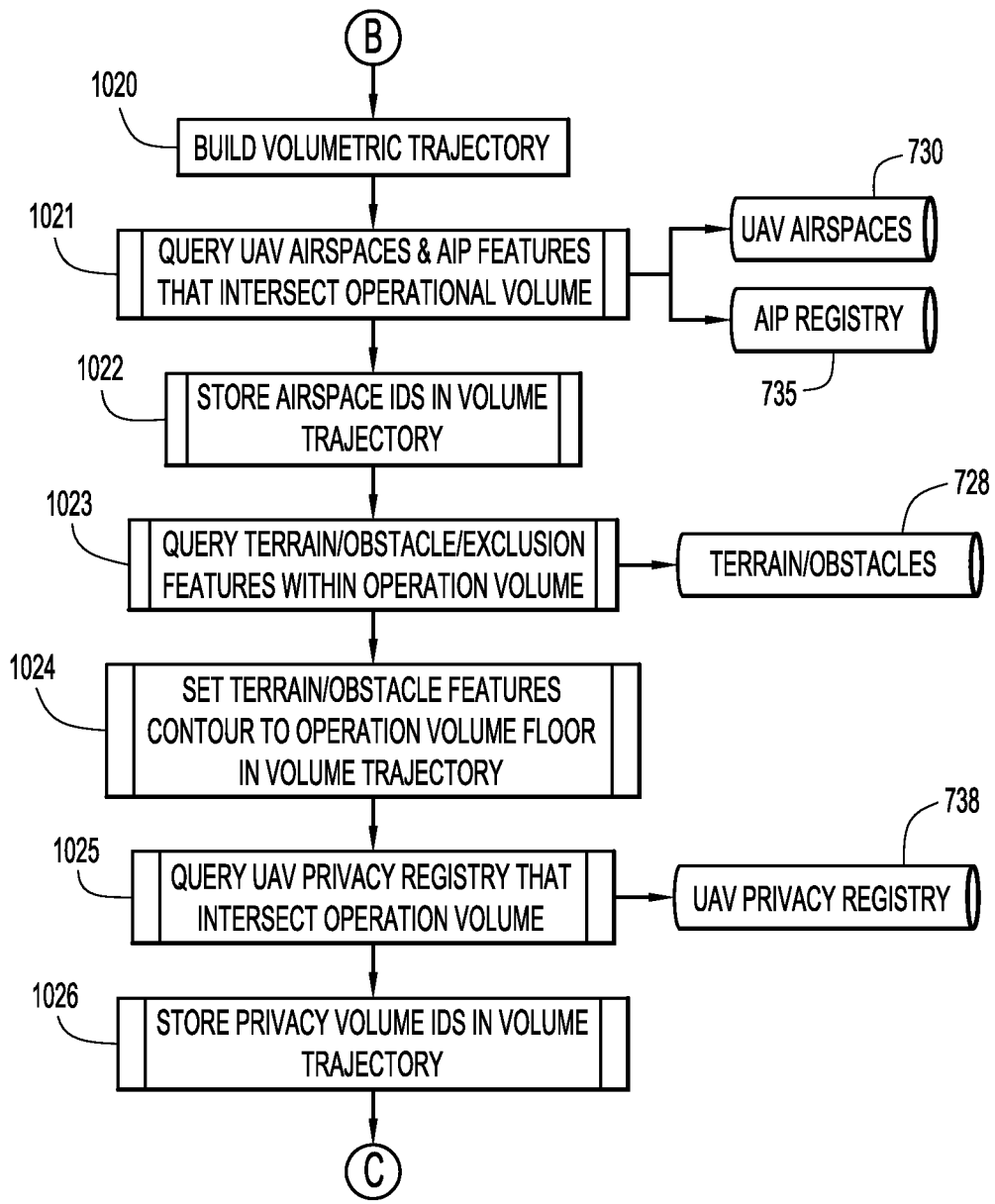
Figure 10D:
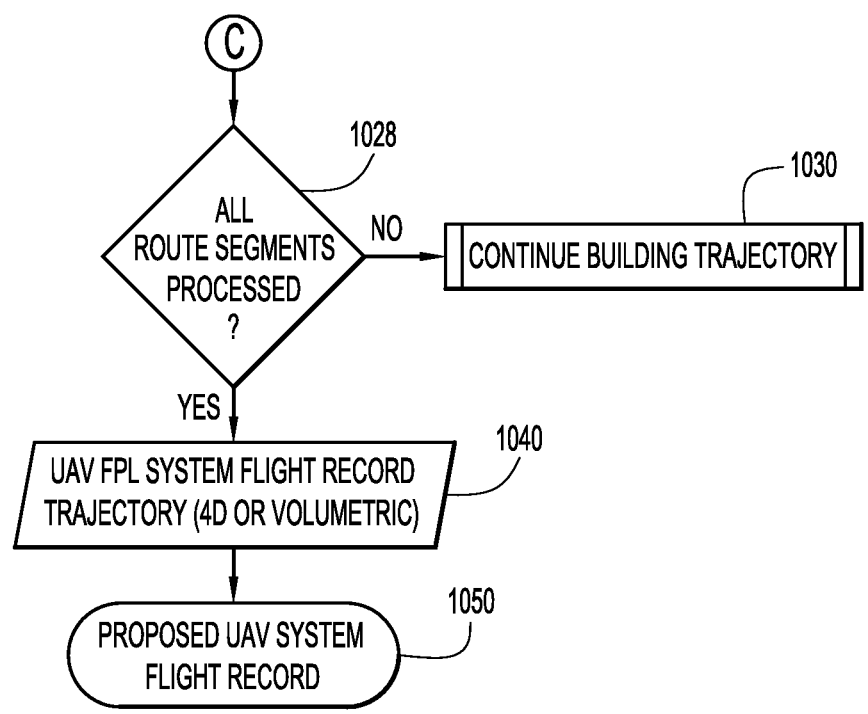

Once the 4D trajectory has been built for a "route" type of route segment of the flight plan proposal in accordance with the flow diagram of FIG. 10B, processing proceeds to the operations shown in FIG. 10D.

FIG. 10C shows an example of the processing involved in building a volumetric trajectory from a proposed trajectory (operation 1020). According to an example implementation, the volumetric trajectory includes:

operation volume ID;
entry time/exit time;
list of UAV/AIP airspace volume IDs;
list of privacy volume IDs;
contour grid (3D contour map defining min/max safe AGL altitudes for operation volume); and
list of conflict detection events.

Building a volumetric trajectory from a proposed "operation volume" from the O/O's flight plan proposal involves geographical and temporal filtering to identify all intersected RA airspace volumes, ANSP airspace volumes (includes service volumes and restricted volumes such as SUAs), and privacy volumes. Each intersecting volume is stored in the UAV system flight record for later compatibility evaluation. Specifically, in operation 1021, the volumetric trajectory is subjected to volumetric intersection filtering through query to the UAV Airspace Registry 730 and the ANSP airspace volumes data store (AIP). In operation 1022, the airspace ID of each intersecting volume along the trajectory is stored in the volumetric trajectory for later compatibility evaluation.

The volumetric trajectory is then used in operation 1023 to geographically query the terrain/obstacles model 728 within the operational volume. In operation 1024, the floor contour map for the operation volume is determined through geographical query to the terrain/obstacles model 728 (i.e., the terrain/obstacles features contour is set to the operation volume floor in the volume trajectory), and the result is stored in the UAV system flight record volumetric trajectory 734. The UAV privacy volumes registry 738 is then queried in operation 1025 for the volumetric trajectory, to determine privacy volumes that intersect the operation volume. In operation 1026, the privacy volume ID of each intersecting privacy volume along the trajectory is stored in the volumetric trajectory for later compatibility evaluation.

Once the volumetric trajectory has been built for a "operation volume" type of route segment of the flight plan proposal in accordance with the flow diagram of FIG. 10C, processing proceeds to the operations shown in FIG. 10D.

It is important to note that O/O-RA flight data processing system dialogs reference trajectory. If there are incompatibilities detected for the proposed trajectory, it is returned to the O/O with clear indications of the incompatibilities integrated into the trajectory, as described in detail above. The O/O may then modify the proposed route/operation volume to remedy the incompatibilities and refile the proposal.

Whether a route segment has been processed to build a 4D trajectory (for a "route" segment type as shown in FIG. 10B) or to build a volumetric trajectory (for a "operation volume" segment type as shown in FIG. 10C), processing proceeds to the operations shown in FIG. 10D. In operation 1028, the RA determines whether all of the route segments have been processed. If not all route segments have been processed, in operation 1030, building of the trajectory continues with the next segment using the operations shown in FIG. 10B or FIG. 10C, depending on the segment type (i.e., processing returns to operation 1004 in FIG. 10A). If the RA determines in operation 1028 that all of the route segments have been processed, the volumetric/4D trajectory is stored in the UAV flight plan system flight record for further safety, security and privacy processing (operation 1040), and the RA generates the proposed UAV flight plan system flight record that defines the four dimensional space (three-dimensional spatial region and a time window) that the UAV will occupy (operation 1050).

As previously explained in connection with the flow diagram of FIG. 8, the flight record generated in operation 818 and described in detail in connection with FIGS. 10A-10D, is the basis for performing four follow-on checks. In relation to the first of these follow-on checks, safety-airspace constraints 820, FIG. 11 illustrates the detailed processing of a flight record performed by the RA's airspace constraints safety and security analysis server 706 (FIG. 7) to identify airspace constraints established for security and flight safety assurance. Each ANSP and UAV RA airspace volume integrated in the flight record trajectory must be evaluated to verify its compatibility with O/O, UAV and flight plan attributes and constraints. For example, an RA UAV airspace may only permit visual line of sight (VLOS) flight rules, exclude imagery payload types, deny UAV classes that exceed a weight class threshold, and limit capacity to 10 concurrent operations. An ANSP airspace volume may deny all UAV operations within a fixed volume centered on an aerodrome and another may require UAV and O/O certification credentials along with navigation and surveillance equipment criteria for access.

Figure 11:
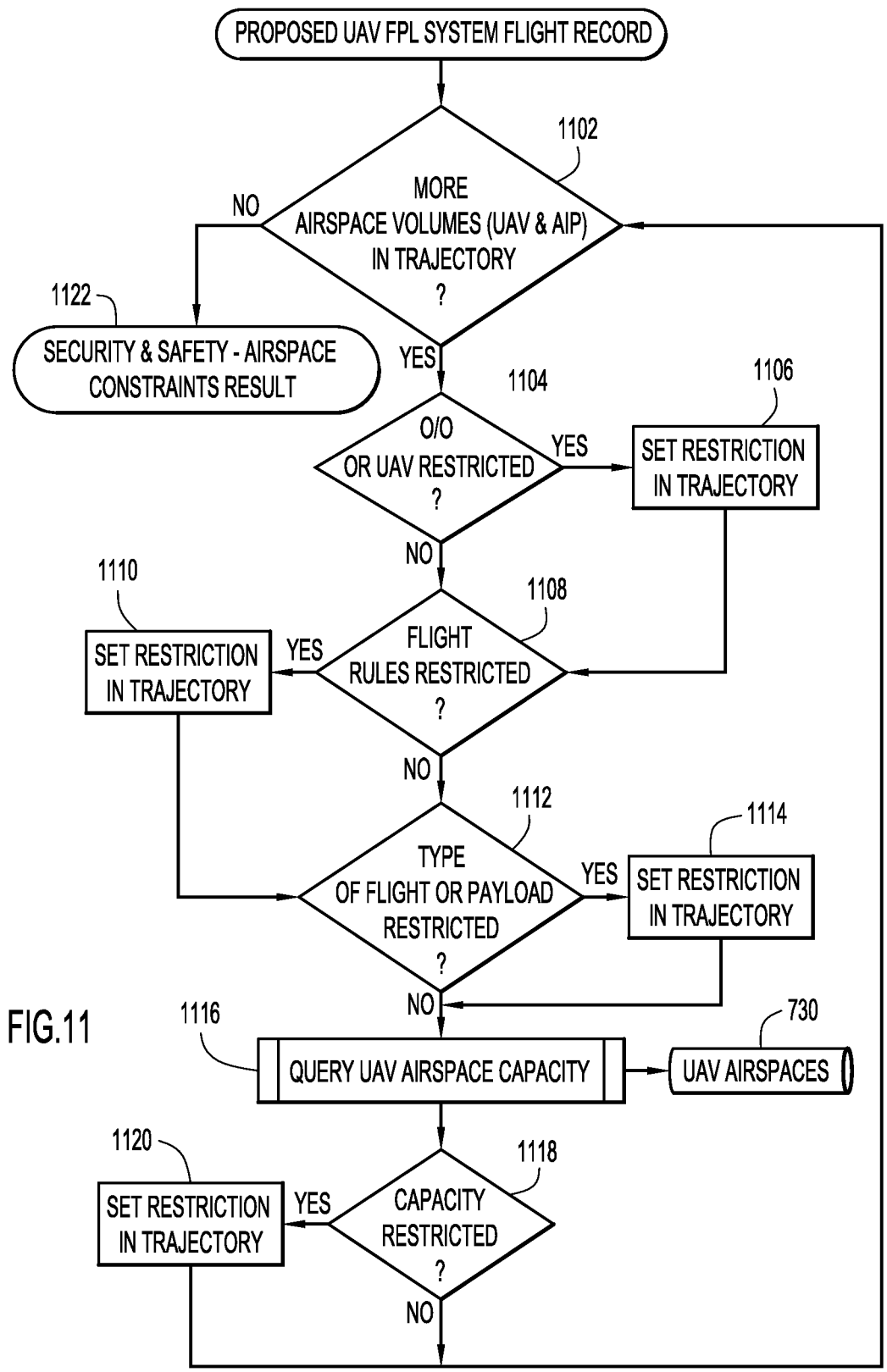
FIG. 11 is a flow diagram illustrating security and flight safety assurance processing via analysis of airspace constraints according to an example implementation.

As more specifically illustrated in FIG. 11, in operation 1102, the RA determines whether there are any remaining airspace volumes (UAV and AIP) in the trajectory of the proposed UAV flight plan system flight record to be evaluated. If so, for the next airspace volume in the trajectory, the RA determines in operation 1104 whether the O/O attributes and the UAV attributes meet airspace safety and security requirements. In this operation, for example, business rules are compared with airspace volume requirements, such as O/O authority level and certifications, and UAV certifications, type, and equipment. Each incompatibility identified in operation 1104 is integrated as a restriction into the flight record trajectory in operation 1106.

From operation 1106 and from operation 1104 where there are no restrictions, processing flows to operation 1108 where the RA determines whether the flight rules meet airspace safety and security requirements. Each flight rule incompatibility identified in operation 1108 is integrated as a restriction into the flight record trajectory in operation 1110.

From operation 1110 and from operation 1108 where there are no restrictions, processing flows to operation 1112 where it is determined whether the type of flight or payload is restricted. Each incompatibility in the type of flight or payload identified in operation 1112 is integrated as a restriction into the flight record trajectory in operation 1114.

From operation 1114 and from operation 1112 where there are no restrictions, processing flows to operation 1116 where the UAV airspace capacity is determined by querying the UAV airspace volume registry 730. In operation 1118, it is determined whether the UAV airspace capacity is exceeded. If so, in operation 1120, a capacity restriction is entered into the flight record trajectory. From operation 1120 and from operation 1118 where there are no restrictions, processing then returns to operation 1102 for the next airspace volume in the trajectory. Once all the airspace volumes in the trajectory have been analyzed, in operation 1122, a security and safety—airspace constraints result is generated by the RA as the output of operation 820 in FIG. 8.

Figure 12:
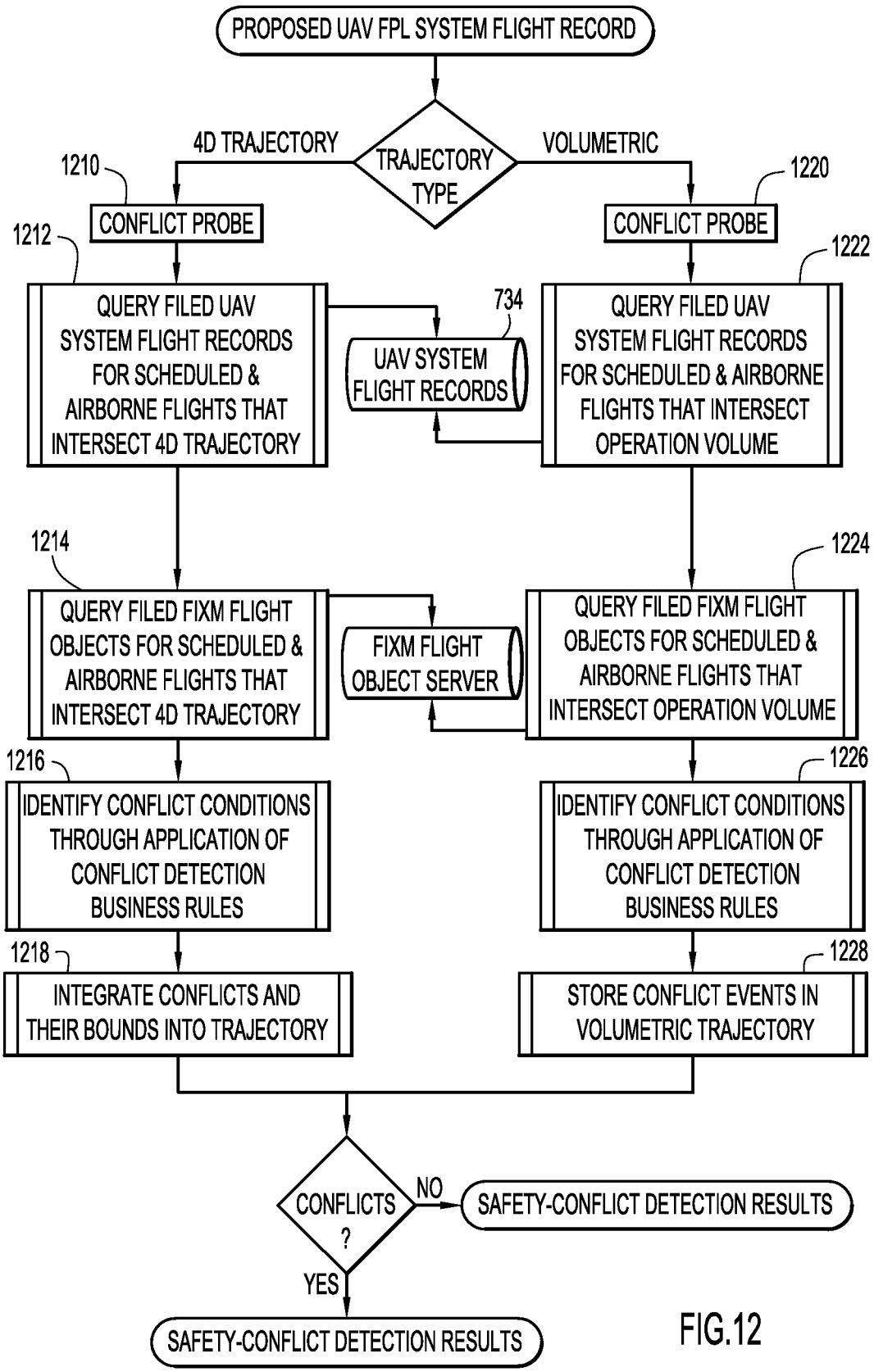
FIG. 12 is a flow diagram illustrating flight safety processing involving conflict detection checks according to an example implementation.

Referring again to FIG. 8, the second of the follow-on checks based on the flight record generated in operation 818 is the safety-conflict detection 822, which relates to conflict flight safety assurance via conflict detection with UAVs and with conventional aircraft. The flow diagram of FIG. 12 illustrates the detailed processing of a flight record by the RA's flight safety conflict detection server 708 (FIG. 7) to identify, detect, and avoid potential conflicts for flight safety assurance.

In general, the conflict detection scope can include determination of conflicts between different UAVs and conflicts between UAVs and conventional aircraft. For both UAV-UAV conflicts and UAV-conventional aircraft conflicts, a proposed UAV trajectory (4D or volumetric) is evaluated by the RA against both types of UAV system flight record trajectories (4D and volumetric), i.e., 4D-4D, 4D-operational volume, and operation volume-operational volume conflicts can be evaluated.

The proposed UAV trajectory must also be analyzed to determine whether there are any conflicts with ANSP restricted airspaces (e.g., temporary flight restriction (TFR) airspaces, special use airspaces (SUAs), NOTAM airspaces) and other UAV/conventional aircraft trajectories, with the proposed UAV trajectory being evaluated against ANSP Flight Object 4D trajectories in filed or airborne states. The proposed UAV trajectory is also inspected for any SUA intersections determined when building the trajectory. Business rules stored in the conflict detection business rules database 732 are applied to identify and test the suitable separation criteria and determine whether the conflict participants have sufficient attributes to suppress the conflict.

For example, if a proposed UAV volumetric trajectory intersects a filed UAV system flight record volumetric trajectory, a conflict is detected. If both UAVs operate under VLOS flight rules, the conflict may be suppressed per configured business rules. According to another example, if a proposed UAV 4D trajectory intersects a TFR volume for a sporting event, a conflict is detected. If the proposed UAV flight plan is "police" type of flight and the O/O has the proper certifications, the conflict may be suppressed per configured business rules.

As more specifically illustrated in FIG. 12, for a 4D trajectory type, a conflict probe (operation 1210) involves: querying the filed UAV system flight records 734 for scheduled and airborne flights that intersect the 4D trajectory (operation 1212); querying the filed flight information exchange model (FIXM) flight object server 709 for scheduled and airborne flights that intersect the 4D trajectory (operation 1214); identifying conflict conditions through application of conflict detection business rules 732 (operation 1216); and integrating conflicts and their bounds into the trajectory (operation 1218). The FIXM flight object server 709 maintains:
flight operations system (FOS) FIXM database and services;
service of local ANSP; and
source of air traffic control (ATC) flight plans with trajectory.

For operation 1216, according to an example implementation, the conflict detection business rules 732 can include:
4D-4D trajectory conflicts—lateral, longitudinal, and vertical separation parameters/tolerances;
4D-operation volume conflicts;
compatibility rules for: UAV equipment and certifications, O/O authority level and certifications, flight rules, and type of flight; and
4D-SUA, TFR, and NOTAM airspace conflicts.

For a volumetric trajectory type, a conflict probe (operation 1220) involves: querying the filed UAV system flight records 734 for scheduled and airborne flights that intersect the operation volume (operation 1222); querying the filed FIXM flight object server for scheduled and airborne flights that intersect the operation volume (operation 1224); identifying conflict conditions through application of conflict detection business rules 732 (operation 1226); and storing conflicts events in the volumetric trajectory (operation 1228). For operation 1226, according to an example implementation, the conflict detection business rules 732 can include:
operation volume-4D trajectory conflicts—lateral, longitudinal, and vertical separation parameters/tolerances;
operation volume-operation volume conflicts;
compatibility rules for: UAV equipment and certifications, O/O authority level and certifications, flight rules, and type of flight; and
operation volume-SUA, TFR, and NOTAM airspace conflicts.

Conflicts detected are integrated into the proposed trajectory, and at the completion of the conflict probes for the 4D trajectory and volumetric trajectory types, a safety-conflict detection result is generated by the RA as the output of operation 822 in FIG. 8.

Figure 13:
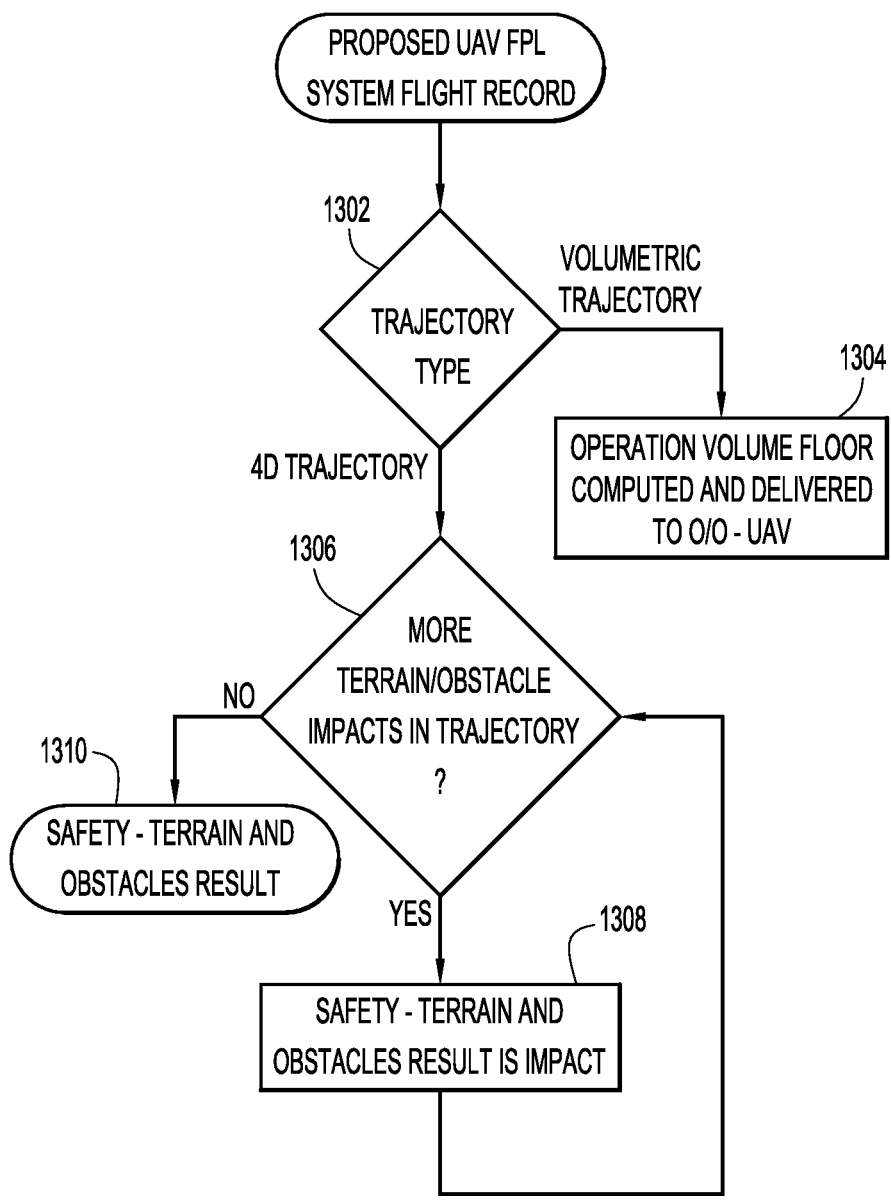
FIG. 13 is a flow diagram illustrating ground safety processing involving terrain and obstacle checks according to an example implementation.

The third of the follow-on checks based on the flight record generated in operation 818 in FIG. 8 is the safety-terrain and obstacles 824, which involves analyzing the proposed UAV trajectory to determine whether there are any conflicts with obstacles or terrain. The flow diagram of FIG. 13 illustrates the detailed processing of a flight record by the RA's ground safety application server 710 (FIG. 7) to identify and avoid terrain and obstacles for ground safety assurance.

In operation 1302, the RA determines whether the trajectory type is a volumetric trajectory or a 4D trajectory. If the proposed UAV flight plan has a volumetric trajectory type, in operation 1304 the RA calculates a volume floor based upon a digital representation of terrain within the volume, and any obstacles (towers, bridges, buildings) within the volume. The proposed floor incorporates a required safety buffer to ensure all obstacles and terrain are cleared safely, and without danger to people.

If the RA determines in operation 1302 that the proposed UAV flight plan has a 4D trajectory type, the specific trajectory is evaluated from end to end against a digital representation of terrain and obstacles along the trajectory. Specifically, in operation 1306, the RA determines from the flight record whether there are any more terrain or obstacle impacts in the trajectory. If so, in operation 1308, a safety—terrain and obstacles result is an impact which is integrated into the proposed trajectory, and processing returns to operation 1306 to determine whether there are any other terrain or obstacles to evaluate. The evaluation includes a buffer along the horizontal axis of the trajectory to ensure obstacle clearance if the trajectory indicates the altitude is below the obstacle height. In operation 1306, once all terrain/obstacle impacts on the trajectory have been evaluated, the safety—terrain and obstacle result is generated in operation 1310 as the output of operation 824 (FIG. 8), in which the conflicts detected are integrated into the proposed trajectory.

Figure 14:
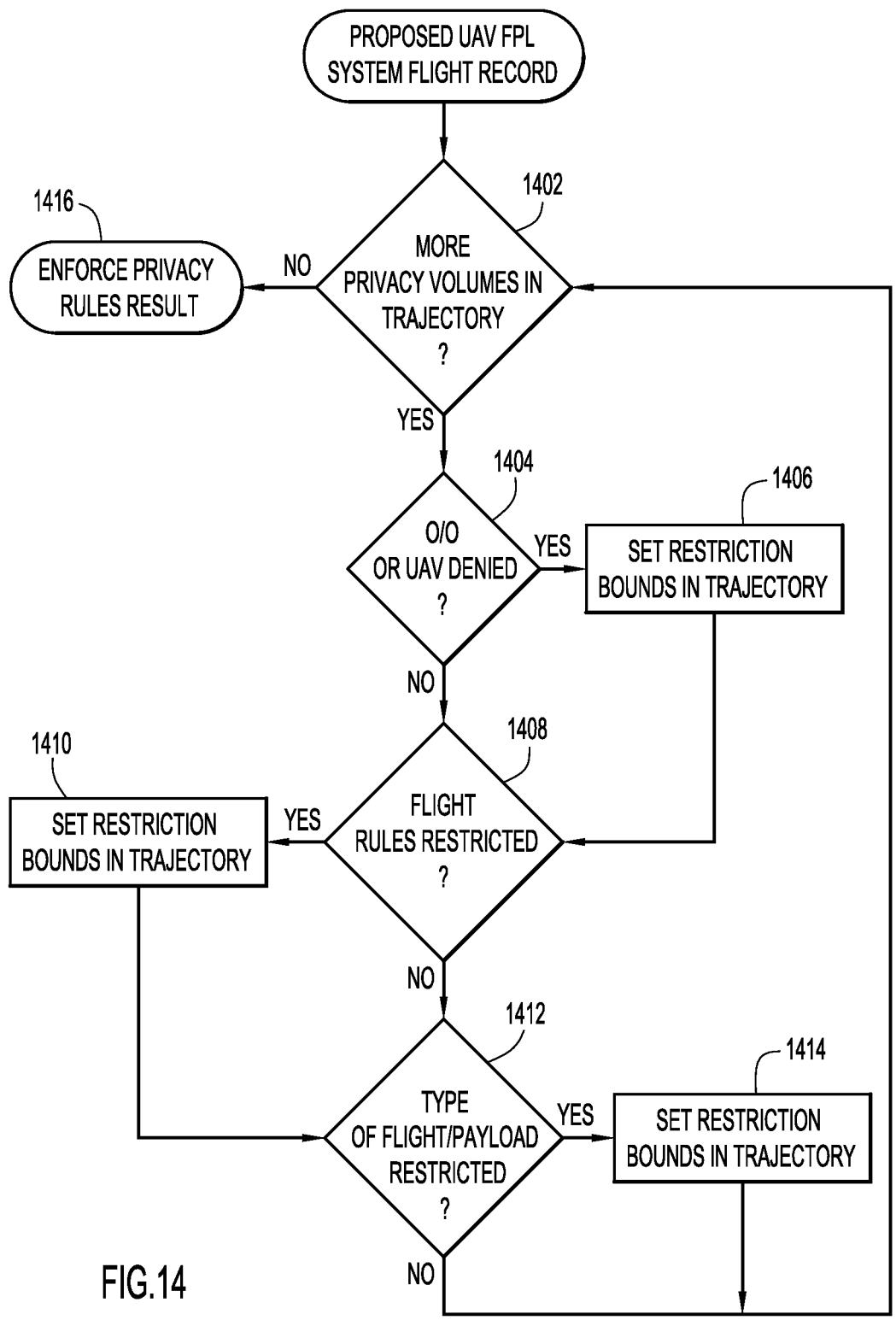
FIG. 14 is a flow diagram illustrating privacy checks processing according to an example implementation.

The fourth of the follow-on checks based on the flight record generated in operation 818 in FIG. 8 is the privacy enforcement and assurance 826, which involves privacy assurance via analysis of airspace exclusions for privacy that may be assigned to airspaces and conditions placed on the O/O. The flow diagram of FIG. 14 illustrates the detailed processing of a flight record for privacy enforcement and assurance. Processing for privacy begins with the UAV flight record that was developed from the plan submitted by the O/O.

The RA privacy processor 712 (FIG. 7) identifies the set of privacy volumes that the flight record overlaps. Privacy volumes are stored in the UAV privacy database registry 738 and have attributes that can deny specific O/O, UAVs, and payloads flown. Privacy volumes are distinct from exclusion zones for security and safety (stored in registry 730) because they involve additional considerations.

In operation 1402, the RA determines whether there are any more privacy volumes in the trajectory. If so, processing proceeds to operation 1404 where, for the next privacy volume, the RA determines whether the privacy volume excludes the O/O or the UAV. Privacy volumes may exclude all O/Os, except for a select few, or may be unique to a specific O/O. For example, a specific O/O may be restricted from flying a UAV in the neighborhood where a person lives for whom the O/O is under a restraining order to stay away. Privacy volumes may also have exclusions on specific UAV, the UAV type, or other UAV attributes. If the O/O or UAV is denied, in operation 1406 the RA may reject or modify the flight plan request, e.g., by setting restriction bounds in the trajectory.

Privacy volumes may also have defined flight rules. From operation 1406 and from operation 1404 where the O/O and UAV are not denied, processing flows to operation 1408, where the RA determines whether the flight rules are restricted. One example is a restriction at flying low altitude over developed areas. Each flight rule restriction identified in operation 1408 is integrated as a restriction into the flight record trajectory in operation 1410, e.g., by setting restriction bounds.

From operation 1410 and from operation 1408 where no flight rule restrictions are found, processing flows to operation 1412 in which the RA determines from the privacy volumes whether the type of flight plan or the payload flown is restricted. Privacy rules may allow certain types of flight plans but not others. For example, overflight of a residential area may be allowed, but not hovering over a particular residence. Finally, privacy rules may also address the payload being flown. For example, the privacy rules may allow video, but not ultra-high resolution cameras, or listening devices. Each flight rule restriction identified in operation 1412 is integrated as a restriction into the flight record trajectory in operation 1414, e.g., by setting restriction bounds.

From operation 1414 and from operation 1412 where there are no restrictions, processing then returns to operation 1402 for the next privacy volume in the trajectory. Once all the privacy volumes in the trajectory have been analyzed, in operation 1416, a privacy result is generated by the RA as the output of privacy operation 826 in FIG. 8 and, with all of the considerations discussed above, and on the basis of such examination, the flight request may be rejected or modified.

Types of Flight Plans

This section describes a number of different types of flight plans that may be evaluated by the RA in the processing described above.

Visual Line of Sight (VLOS). VLOS is the simplest level of flight plans and may include, for example, hovering overhead. With VLOS, the O/O is in the control loop with a wireless communications link to the UAV. The UAV is always in site of O/O and below a defined AGS (e.g., 400 feet). No surveillance is required, since the O/O controls the UAV and is responsible for Detect and Avoid (DAA).

RF Line of Site (RFLOS). With RFLOS, the UAV may go out of sight of the O/O, but the UAV is always in RF communications with O/O. RF communications support the O/O in the UAV control loop, and DAA is provided via a UAV video camera as a payload that transfers real-time video to the O/O who uses the video for DAA.

Linear Low Altitude.

Linear Low Altitude includes operations such as pipeline and electric power line monitoring. This flight plan requires autonomous operations, and the O/O manages by objective. The UAV follows a defined line of operation, e.g., over a power line or pipeline, and may require limited amount of surveillance, may be autonomous, or may be controlled by the O/O by objective (e.g., way points).

Grid Low Altitude.

Grid Low Altitude includes operations such as a farmer monitoring crops and involves autonomous operations with very low flyover fields over covering many acres. Typically, the UAV is launched from a field, executes its mission, and returns to the launch point or other designated home base.

Bee Line Low Altitude.

An example of this type of flight plan, which involves autonomous operations, is a package delivery via a bee line between a distribution hub and delivery location.

The autonomous operations flight plans can be described as a set of way-points in latitude, longitude, and altitude, and the UAV travels linearly between the way-points.

Endurance.

Long duration flights are classified under this type of flight plan and include, for example, medium or high altitude UAVs providing communications infrastructure supporting activities on the ground. This example requires a UAV that supports communications with the RA.

Recurring and Perpetual Flight Plans.

This type of flight plan includes repetitive flights performed periodically and may be approved by the RA as a series of time windows, or may be perpetually approved for an extended period of time. An example of the latter is a farmer who has flight privileges over the owned land that may be granted for an extended period of time, such as a month or longer.

Support for National Transportation and Safety Board (NTSB) and Other Investigation When a UAV is involved in an accident, the RA will provide all relevant data on the UAV. This will include static data such as the O/O, EID, and its flight attributes and capabilities. The data will also include dynamic data such as the approved flight plan, surveillance data if available, and the UAV payload. All of the above data is archived to support data retrieval for post mortem analysis of accidents and incidents. Where applicable, the RA will support playback capability showing a visual replay of UAV and other aircraft operations in the vicinity of the accident.

Situational Awareness Provided to UAV Operator

An application or series of applications provided either by the RA or by third parties can provide situational awareness capabilities to the UAV operator. Such applications provide services to the operator in advance of the flight, during the flight, and after the flight.

In Advance of the Flight:

One or more applications assist the UAV operator in filing flight plans. In advance, the UAV operator may "browse" into the future to view the current demands on the airspace as provided by the RA. This demand is represented by the number of UAV filed flight plans in the immediately desired and surrounding airspaces, as well as known exclusion zones. The application may indicate the number of remaining "slots" which are available before the RA "closes" the airspace to additional filed flight plans. Additional information such as weather forecasts, NOTAMS, or other information may be provided.

During the Flight:

During the flight, the UAV operator is provided with situational awareness via one or more applications either standalone or integrated into a ground control station (GCS). Applications such as Harris' UAS-Vue provide situational awareness from the UAV operator's perspective. This application resembles a "moving map" similar to a map presented to manned aircraft flights, or an automobile GPS display. This application presents the operator's own UAV (the ownship) centered in the display superimposed over the approved flight plan, inclusion zones, and exclusion zones. In addition, nearby traffic is displayed for both manned and unmanned aircraft. Additional information such as the authorized temporal window of flight is displayed, along with weather, NOTAMs, or other pertinent information. Alerting capabilities are embedded to notify the operator when conditions change which require the operator's attention. Applications such as Harris' Jagwire allow for real-time cloud based streaming of video or data collection.

After the Flight:

After the flight, the UAV operator can upload flight details to a personalized online account or accounts. Various types of these applications will exist and may resemble popular athlete-based social media apps such as Strava, RunKeeper, MapMyRide, etc. With these types of applications, operators are able to upload flight tracks, flight plans, photos, video. Other accounts will be less social and more analytical, allowing the performance of the UAV to be analyzed, tabular data downloaded an analyzed, etc.

Situational Awareness for the RA

Applications such as Harris' Symphony RangeVue application allow for a comprehensive picture of all airspace across the NAS. This GIS platform allows for various map overlays, and can include layers depicting the allowable flight plans for each UAV. The map can depict all exclusion "no-fly" zones and through geofencing and alerting capabilities, and alert RA operators if non-compliant aircraft encroach into these zones. Beyond maps, the Symphony RangeVue application is fed by the Harris NextGen data set which is a fusion of all FAA surveillance systems, including radar, ADS-B, Wide Area Multilateration (WAM) systems, and surface surveillance systems. In addition to the FAA surveillance data, the NextGen data set is augmented with additional low-altitude surveillance systems in order to track low altitude UAVs.

Situational Awareness for the Public

To provide UAV situation awareness to the general public, the UAV application server 714 is Internet accessible to allow the public to see the UAVs that are operating in any region. UAVs may fly in open (i.e., with avatars attached), or anonymously (e.g., for law enforcement applications). This is a component of privacy rights, whereby the public can see who is flying in airspaces that may invade their privacy and provide data for them to apply for a privacy exclusion zone.

Having described example embodiments a system and method to register and regulate unmanned aerial vehicle operations, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method of establishing and using an unmanned aerial vehicle (UAV) flight plan, comprising:
    receiving, by a registration authority (RA) server, a flight plan request comprising a proposed flight plan for a UAV, the UAV having an onboard flight lock that is initially turned on to prevent the UAV from flying;
    building, by the RA server, a flight plan trajectory from the flight plan request;
    determining, by the RA server, whether the flight plan trajectory conflicts with exclusion zones that restrict operation of the UAV;
    sending from the RA server an approved flight plan that is destined for the UAV, the approved flight plan conveying to the UAV an authority to fly in a defined inclusion zone in a defined time window;
    receiving, by the UAV, the approved flight plan;
    determining, by the UAV, whether the received approved flight plan meets criteria to turn off the flight lock; and
    if the criteria are met, by the UAV, turning off the flight lock to enable the UAV to fly.

2. The method of claim 1, wherein sending the approved flight plan comprises sending: a key-signed flight plan, a non-encrypted flight plan, and an encrypted UAV electronic identification (EID).

3. The method of claim 2, wherein the determining, by the UAV, includes determining that the criteria are met if the non-encrypted flight matches the key-signed flight plan after decryption, a stored UAV EID matches the encrypted UAV EID after decryption, and a location and time provided by the UAV are consistent with the defined inclusion zone and the defined time window of the approved flight plan.

4. The method of claim 1, wherein sending the approved flight plan comprises sending the approved flight plan to a cellular receiver of the UAV.

5. The method of claim 1, further comprising modifying, by the RA server, the proposed flight plan in the event of a conflict with an exclusion zone to produce the approved flight plan.

6. The method of claim 1, wherein determining whether the flight plan trajectory conflicts with exclusion zones includes determining whether the flight plan trajectory conflicts with airspace constraints based on safety restrictions, flight plans of other airborne objects, terrain and obstacles, and privacy restrictions.

7. The method of claim 1, wherein building the flight plan trajectory comprises building at least a portion of the flight plan trajectory as a volumetric trajectory that defines a geographic volume that contains UAV operations in four dimensions.

8. The method of claim 1, wherein building the flight plan trajectory comprises building at least a portion of the flight plan trajectory as a four dimensional (4D) trajectory that defines a UAV path of flight in terms of trajectory change points with containment deviation tolerances.

9. A system for establishing and using an unmanned aerial vehicle (UAV) flight plan, comprising:
    a UAV having an onboard flight lock that is turned on to prevent the UAV from flying or turned off to enable the UAV to fly, wherein the flight lock is initially turned on; and
    a registration authority server, including:
        an interface to receive a flight plan request comprising a proposed flight plan for the UAV;
        a trajectory building engine to build a flight plan trajectory from the flight plan request;

one or more processors to determine whether the flight plan trajectory conflicts with exclusion zones that restrict operation of the UAV; and an interface to send an approved flight plan that is destined for the UAV, the approved flight plan conveying to the UAV an authority to fly in a defined inclusion zone in a defined time window;

wherein the UAV is configured to:
receive the approved flight plan;
determine whether the received approved flight plan meets criteria to turn off the flight lock; and
if the criteria are met, turn off the flight lock to enable the UAV to fly.

10. The system of claim 9, wherein the approved flight plan comprises: a key-signed flight plan, a non-encrypted flight plan, and an encrypted UAV electronic identification (EID).

11. The system of claim 10, wherein the UAV is further configured to determine that the criteria are met if the non-encrypted flight plan matches the key-signed flight plan after decryption, a UAV EID stored in the UAV matches the encrypted UAV EID after decryption, and a location and time provided by the UAV are consistent with the defined inclusion zone and the defined time window of the approved flight plan.

12. The system of claim 9, wherein the interface to send enables transmission of the approved flight plan to a cellular receiver of the UAV.

13. The system of claim 9, wherein the processor is adapted to modify the proposed flight plan in response to a conflict with an exclusion zone to produce the approved flight plan.

14. The system of claim 9, wherein the processor is adapted to determine whether the flight plan trajectory conflicts with airspace constraints based on safety restrictions, flight plans of other airborne objects, terrain and obstacles, and privacy restrictions.

15. The system of claim 9, wherein the trajectory building engine is adapted to build at least a portion of the flight plan trajectory as a volumetric trajectory that defines a geographic volume that contains UAV operations in four dimensions.

16. The system of claim 9, wherein the trajectory building engine is adapted to build at least a portion of the flight plan trajectory as a four dimensional (4D) trajectory that defines a UAV path of flight in terms of trajectory change points with containment deviation tolerances.

17. An unmanned aerial vehicle (UAV), comprising:
an engine and flight control surfaces;
a position, navigation, and time (PNT) module to provide PNT information;
a communication interface to receive data;
a processor coupled to the flight control surfaces, the PNT module, and the communication interface, and configured to:
implement a flight lock that when turned on prevents the UAV from flying and when turned off enables the UAV to fly;
initially turn on the flight lock to prevent the UAV from flying;
receive, via the communication interface, an approved flight plan conveying authority to fly a UAV in a defined time window in a defined inclusion zone that avoids conflicts with flight path exclusion zones;
determine whether the approved flight plan meets criteria to turn off the flight lock; and
if the criteria are met, turn off the flight lock to enable the UAV to fly.

18. The UAV of claim 17, wherein the processor is further configured to, once the flight lock is turned off and the UAV is in flight:
cause the UAV to fly along a path in accordance with the approved flight plan; and
keep the flight lock turned off while a location of the UAV and time provided by the PNT module are consistent with the defined inclusion zone and the defined time window, and otherwise turn on the flight lock.

19. The UAV of claim 17, wherein:
the approved flight plan includes an encrypted flight plan, a non-encrypted flight plan, and an encrypted UAV electronic identification (EID); and
the processor is configured to determine that the criteria are met if the unencrypted flight plan matches the encrypted flight after decryption, an EID stored in a memory of the UAV matches the encrypted EID after decryption, and a location and time provided by the PNT module are consistent with the defined inclusion zone and the defined time window of the approved flight plan.

20. The apparatus of claim 17, wherein the flight path exclusion zones include airspace constraints based on safety restrictions, flight plans of other airborne objects, terrain and obstacles, and privacy restrictions.

* * * * *